United States Patent
Miyazaki et al.

(10) Patent No.: US 7,871,003 B2
(45) Date of Patent: Jan. 18, 2011

(54) INFORMATION READER FOR OPTICALLY READING CODE ON OBJECT

(75) Inventors: Manabu Miyazaki, Oobu (JP); Kunihiko Ito, Chiryu (JP); Koji Konosu, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 730 days.

(21) Appl. No.: 11/826,551

(22) Filed: Jul. 17, 2007

(65) Prior Publication Data

US 2008/0017717 A1     Jan. 24, 2008

(30) Foreign Application Priority Data

Jul. 20, 2006    (JP)    .............................. 2006-197717
Feb. 27, 2007    (JP)    .............................. 2007-047670

(51) Int. Cl.
G06K 7/14    (2006.01)
G06K 7/10    (2006.01)

(52) U.S. Cl. .................................. 235/454; 235/462.24

(58) Field of Classification Search ................. 235/435, 235/454, 455, 460, 462.11, 462.17, 462.24, 235/462.32, 462.41
See application file for complete search history.

(56) References Cited

U.S. PATENT DOCUMENTS 5,923,020 A * 7/1999 Kurokawa et al. .......... 235/454
6,661,521 B1 * 12/2003 Stern ..................... 235/462.42
2006/0131419 A1    6/2006 Nunnink

FOREIGN PATENT DOCUMENTS

| DE | 697 25 021 T2 | 4/2004 |
| DE | 601 30 546 T2 | 8/2008 |
| JP | A-2000-099625 | 4/2000 |
| JP | A-2005-018391 | 1/2005 |

OTHER PUBLICATIONS

Office Action issued from the German Patent Office on Apr. 2, 2009 in the corresponding German patent application No. 10 2007 032 589.6-53 (and English translation).

* cited by examiner

*Primary Examiner*—Thien M Le
(74) *Attorney, Agent, or Firm*—Posz Law Group, PLC

(57) ABSTRACT

An information reader has blocks of bright field illuminating units illuminating an information code directly marked on an object with first lights to regularly reflect the lights on the code, blocks of dark field illuminating units illuminating the code with second lights to irregularly reflect the lights on the code, an optical system, and a control section lighting the blocks of bright and dark field illuminating units by turns or simultaneously. The optical system forms an image of the code from each of the first and second lights or a combination of the first and second lights reflected on the code and reads the code from the images. The first lights are transmitted along an optical axis of the optical system. The second lights are transmitted toward the optical axis while slightly shifted toward the code.

29 Claims, 27 Drawing Sheets

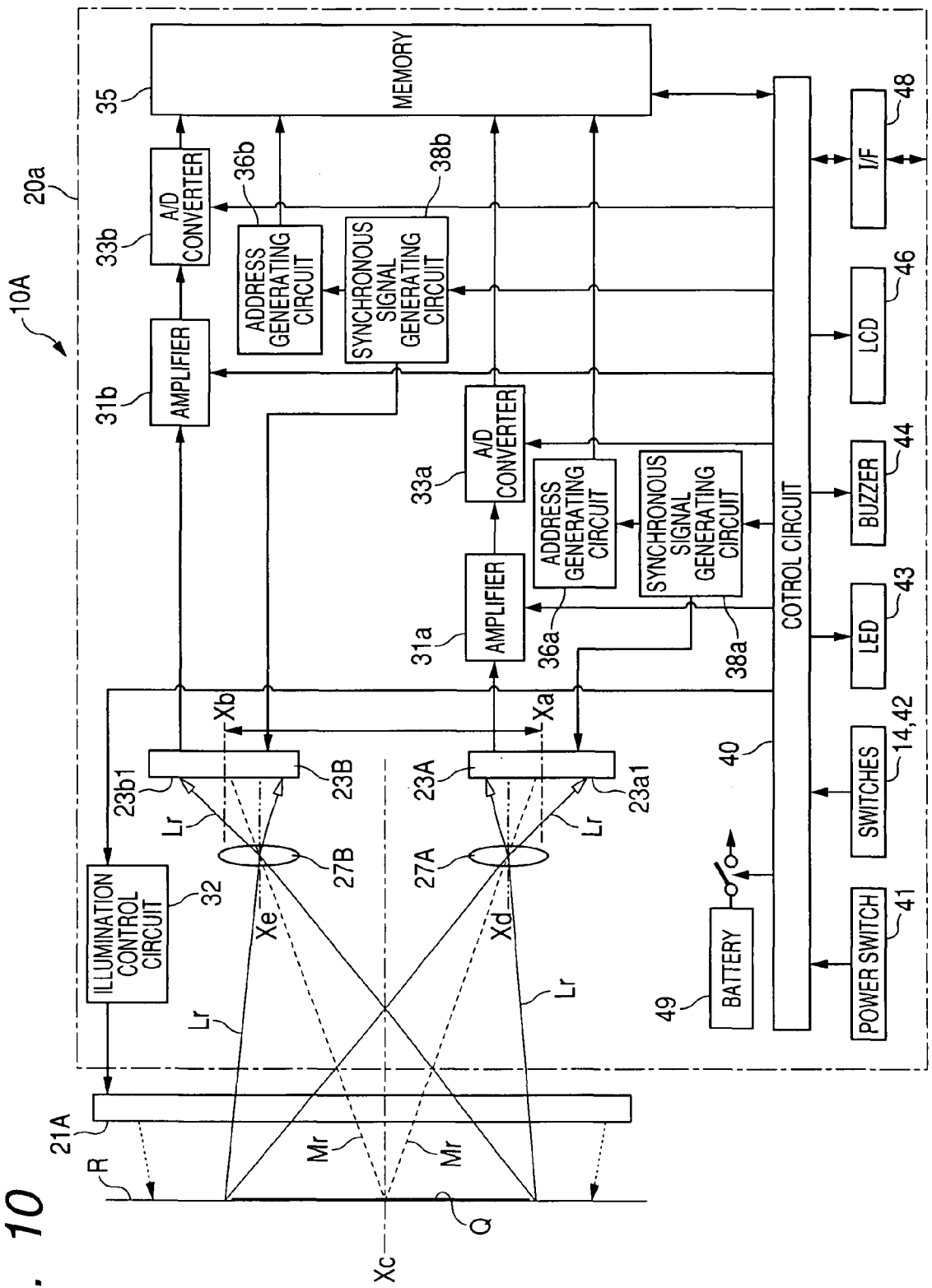

FIG. 15A
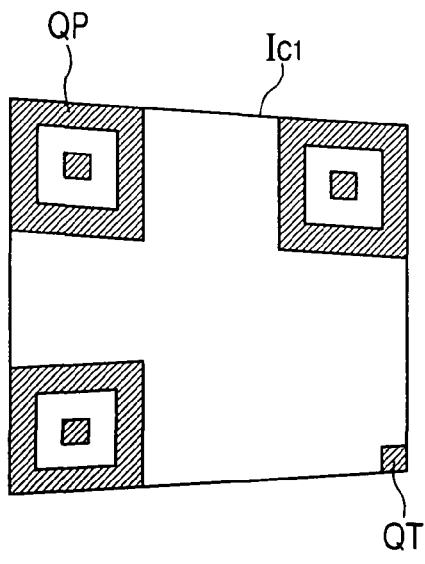
FIG. 15B
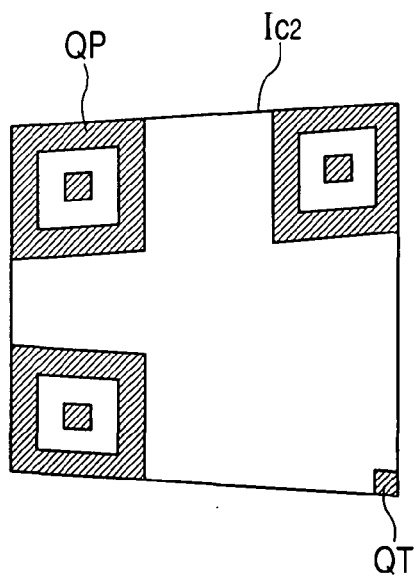
FIG. 15C
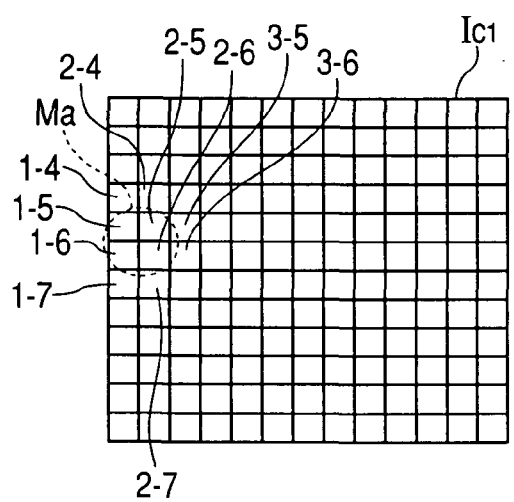
FIG. 15D
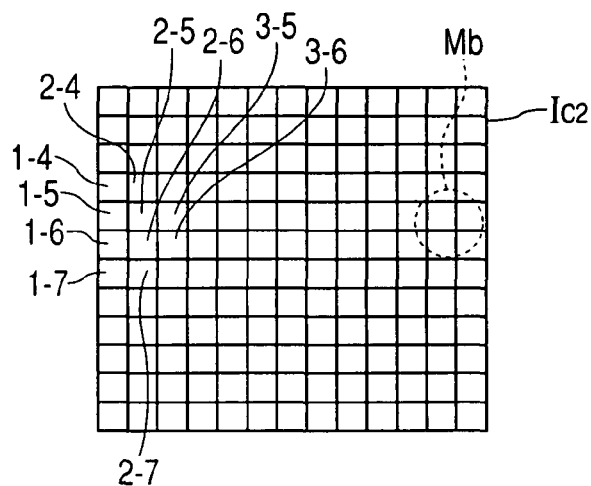
FIG. 15E
| | 1-4 | | 2-4 |
|---|---|---|---|
| 1-4 | 36 | 36 | |
| 1-5 | 255 | 255 | 36 |
| 1-6 | 255 | 255 | 78 |
| 1-7 | 78 | 36 | |
FIG. 15F
| | 1-4 | | 2-4 |
|---|---|---|---|
| 1-4 | 36 | 36 | |
| 1-5 | 78 | 25 | 36 |
| 1-6 | 78 | 24 | 78 |
| 1-7 | 78 | 36 | |

| ILLUMINATION UNITS | ILLUMINATED REGIONS |
|---|---|
| L1 | A1 |
| L2 | A2 |
| L3 | A3 |
| L4 | A4 |
| L5 | A5 |
| L6 | A6 |
| L7 | A7 |
| L8 | A8 |
| L9 | A9 |
| L10 | A10 |
| L11 | A11 |
| L12 | A12 |

INFORMATION READER FOR OPTICALLY READING CODE ON OBJECT

CROSS-REFERENCE TO RELATED APPLICATION

This application is based upon and claims the benefit of priority of the prior Japanese Patent Application 2006-197717 filed on Jul. 20, 2006, and the prior Japanese Patent Application 2007-047670 filed on Feb. 27, 2007 so that the contents of which are incorporated herein by reference.

BACKGROUND OF THE INVENTION

1. Field of the Invention

The present invention relates generally to an information optical reader which optically reads an information code such as a Quick Response (QR) code (registered trademark) directly marked on an object such as a commercial article or the like by a printing work, an attaching work or a marking press, and more particularly to the information optical reader which optically reads an information code embossed, engraved or carved on an object by the marking press so as to form concavities and/or convexities on the object.

2. Description of Related Art

To record information about an object such as a commercial article in the object, an information code has been directly marked on the object by printing or marking press. When the direct marking such as dot impact direct marking or laser marking is performed for the object to form an information code carved on the object, grooves or concavities are formed on an information marking area of the object. To read the information code carved on the object, the marking area of the object is illuminated with an information optical reader, and the reader analyzes an intensity distribution of light reflected on the object. However, when the marking area of the object is illuminated from a position just above the marked area, the reflected light sometimes has a uniform distribution of intensity due to a uniform reflectance of the light on the marking area. In this case, the reader cannot read the information code from the object.

To solve this problem, a user illuminates the marked area of the object with a handy type information optical reader while adjusting the lighting position and direction of the reader to the object so as to illuminate the marked area from an appropriate direction slanting to the object. Further, in case of a stationary information optical reader, the user repeatedly changes an illuminator of the reader to another one while checking clearness of the read information code, and the user finally finds an illuminator optimum to the information code and the object.

As one of stationary optical readers, Published Japanese Patent First Publication No. 2005-18391 has disclosed a code reader. In this reader, a user repeatedly changes an illumination color of light set in the reader to check a difference in brightness of the color between light reflected from a code carved on an object and light reflected from a background area. The user finally finds out an illumination color optimum to the code according to the brightness difference.

Further, as another stationary optical reader, Published Japanese Patent First Publication No. 2000-99625 has disclosed a letter recognizer. In this recognizer, a code carved on a wafer is illuminated with each of a light source of a bright field illumination system and a light source of a dark field illumination system to detect a bright field image and a dark field image, and the code is recognized based on a difference between the images. Further, a position of the light source of the dark field illumination system is manually changed to maximize a contrast in the dark field image.

In case of the code reader disclosed in the Publication No. 2005-18391, illumination colors such as red, blue and green are selected one by one to read a code illuminated with light of each selected color. However, because only the bright field illumination is used, a mirror reflection easily occurs on the surface of the object. Therefore, it is difficult to read a code directly marked on the object in the bright field illumination.

Further, in case of the letter recognizer disclosed in the Publication No. 2000-99625, the light sources of the bright and dark field illumination systems and the position of the light source of the dark field illumination system are manually changed. However, this change is performed without considering the color, the material or the shape of the object. Further, it is required to repeatedly change the light sources of the bright and dark field illumination systems and the position of the light source of the dark field illumination system until an image with a high contrast is found out by chance.

Further, when a light is incident on a glossy or glazed paper at a large incident angle to the paper to read an information code printed on the paper, a mirror reflection often occurs on the surface of the paper. In this case, a portion of a code image corresponding to a mirror reflection portion of the code is always set at a bright (or white) level regardless of a black or white color of the mirror reflection portion. Therefore, the code cannot be correctly read. Particularly, when an information code is carved on a glossy metallic plate by means of the direct marking, a mirror reflection considerably occurs on the surface of the plate. Therefore, a conventional information optical reader cannot-correctly read an information code printed or carved on a glossy or glazed object.

SUMMARY OF THE INVENTION

An object of the present invention is to provide, with due consideration to the drawbacks of the conventional information optical reader, an information optical reader which reliably reads an information code directly marked on an object regardless of a marking process such as printing or carving, a material of the object and a color of the code.

According to a first aspect of this invention, the object is achieved by the provision of an information reader for optically reading an information code directly marked on an object, comprising a bright field illuminator that can be lighted to illuminate the information code with a first light at a first luminous angle to the information code and to regularly reflect the first light on the information code, a dark field illuminator that can be lighted to illuminate the information code with a second light at a second luminous angle to the information code and to regularly reflect the second light on the information code, an optical system that forms an image of the information code from the first light or the second light reflected on the information code, and a control section that controls the bright field illuminator and the dark field illuminator to light the bright field illuminator and the dark field illuminator by turns or to simultaneously light the bright and dark field illuminators such that the optical system forms an image of the information code from each of the first and second lights reflected on the information code or from a combination of the first and second lights simultaneously reflected on the information code, and reads the information code from the images. The second luminous angle differs from the first luminous angle.

With this structure of the reader, the bright field illuminator is used to illuminate the information code with the first light and to regularly reflect the first light on the information code.

The dark field illuminator is used to illuminate the information code with the second light and to irregularly reflect the second light on the information code. Under control of the control section, the bright field illuminator and the dark field illuminator emit the first light and the second light by turns, or the bright and dark field illuminators simultaneously emit the first and second lights. Therefore, the control section selects one of the bright field illumination and the dark field illumination by which the information code directly marked on the object is easily read, or selects both the bright and dark field illuminations when the information code is easily read by the combination of the bright and dark field illuminations. Particularly, when the information code is directly printed on a glossy or glazed paper or is carved on a glossy metallic plate, the dark field illuminator is preferred to avoid a mirror reflection occurring on the surface of the information code.

Accordingly, the reader can reliably read an information code directly marked on an object regardless of a marking process such as printing or carving, a material of the object and colors of the code.

According to a second aspect of this invention, the object is achieved by the provision of an information reader for optically reading an information code directly marked on an object, comprising an optical system that forms an image of the information code placed around an optical axis from a light reflected on the information code, a plurality of light emitting units each of which can be lighted to emit a first light and a second light, a dark field illuminator that changes a transmission direction of the first lights to form first changed lights such that the first changed lights are transmitted toward the optical axis so as to illuminate the information code at a first luminous angle to the information code in a dark field illumination along first illumination directions differing from one another, a bright field illuminator that changes a transmission direction of the second lights to form second changed lights such that the second changed lights are transmitted toward a direction substantially parallel to the optical axis so as to illuminate the information code at a second luminous angle to the information code in a bright field illumination along second illumination directions differing from one another, and a control section that controls the light emitting units to select and light the light emitting units by turns such that the optical system forms an image of the information code from the first and second lights emitted from each selected light emitting unit, and reads the information code from the images. The second luminous angle differs from the first luminous angle.

With this structure of the reader, the control section selects and lights the light emitting units by turns, so that the information code is illuminated with the first and second changed lights derived from the selected light emitting unit while the first and second illumination directions of the first and second changed lights are changed each time one light emitting unit is selected. Further, the information code is illuminated with the first and second changed lights at both of the first and second luminous angles.

Accordingly, the reader can reliably read the information code directly marked on the object regardless of a marking process such as printing or carving, a material of the object and colors of the code.

BRIEF DESCRIPTION OF THE DRAWINGS

FIG. 10 is a block diagram of a control section of a handy type information optical reader according to the third embodiment;

FIG. 15A is a view schematically showing a code image of a QR code formed in one sensor shown in FIG. 10;

FIG. 15B is a view schematically showing a code image of a QR code formed in another sensor shown in FIG. 10;

FIG. 15C shows a matrix of cells in a code image detected by one sensor;

FIG. 15D shows a matrix of cells in the code image detected by another sensor;

FIG. 15E shows digital illumination levels set for cells of one code image corresponding to a first area of a QR code;

FIG. 15F shows digital illumination levels set for cells of another code image corresponding to the first area;

DETAILED DESCRIPTION OF THE PREFERRED EMBODIMENTS

Figure 1:
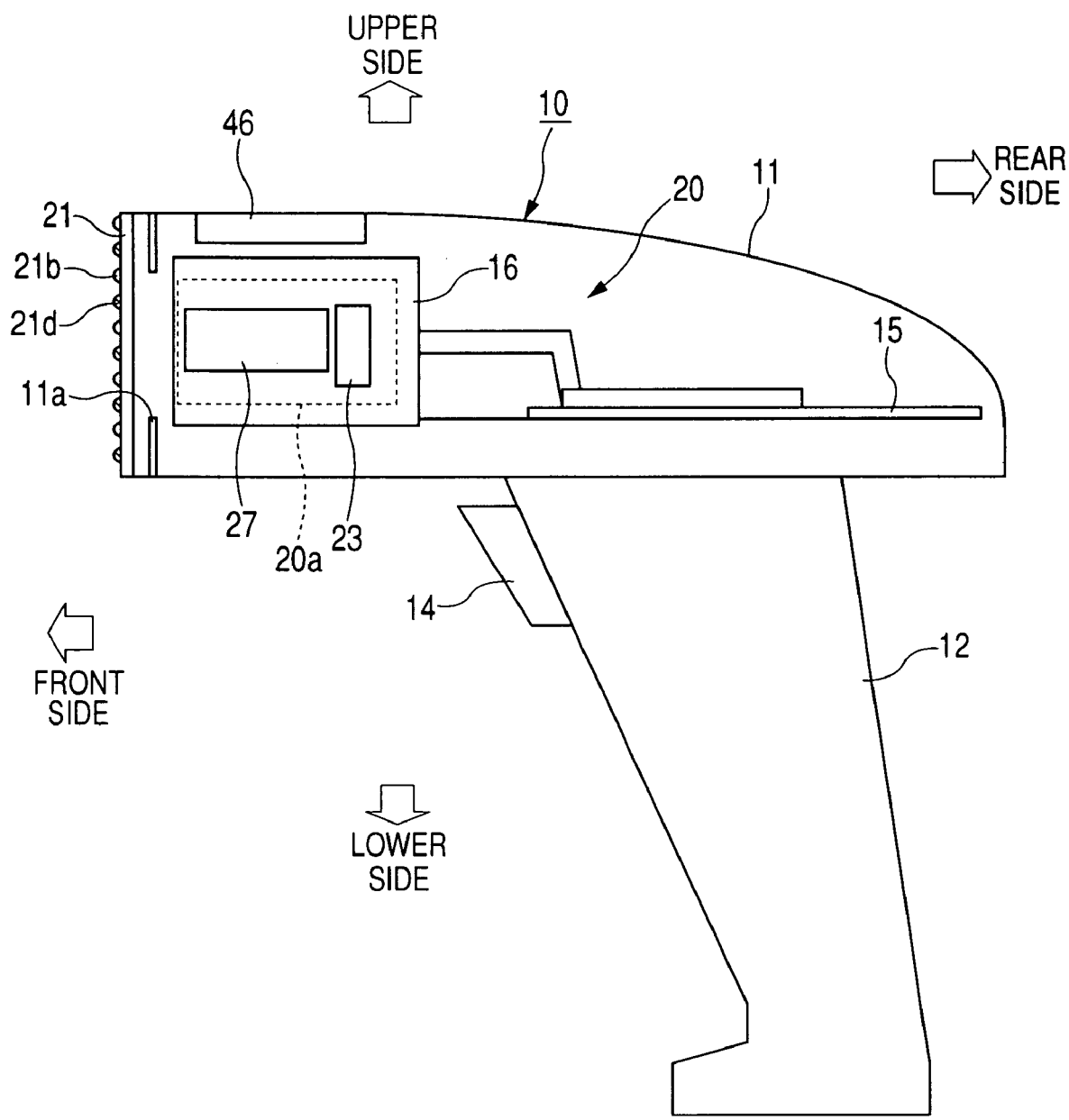
FIG. 1 is a side view, with portions broken away for clarity, of a handy type information optical reader according to the first embodiment of the present invention.

Embodiments of the present invention will now be described with reference to the accompanying drawings, in which like reference numerals indicate like parts, members or elements throughout the specification unless otherwise indicated.

First Embodiment

Figure 2:
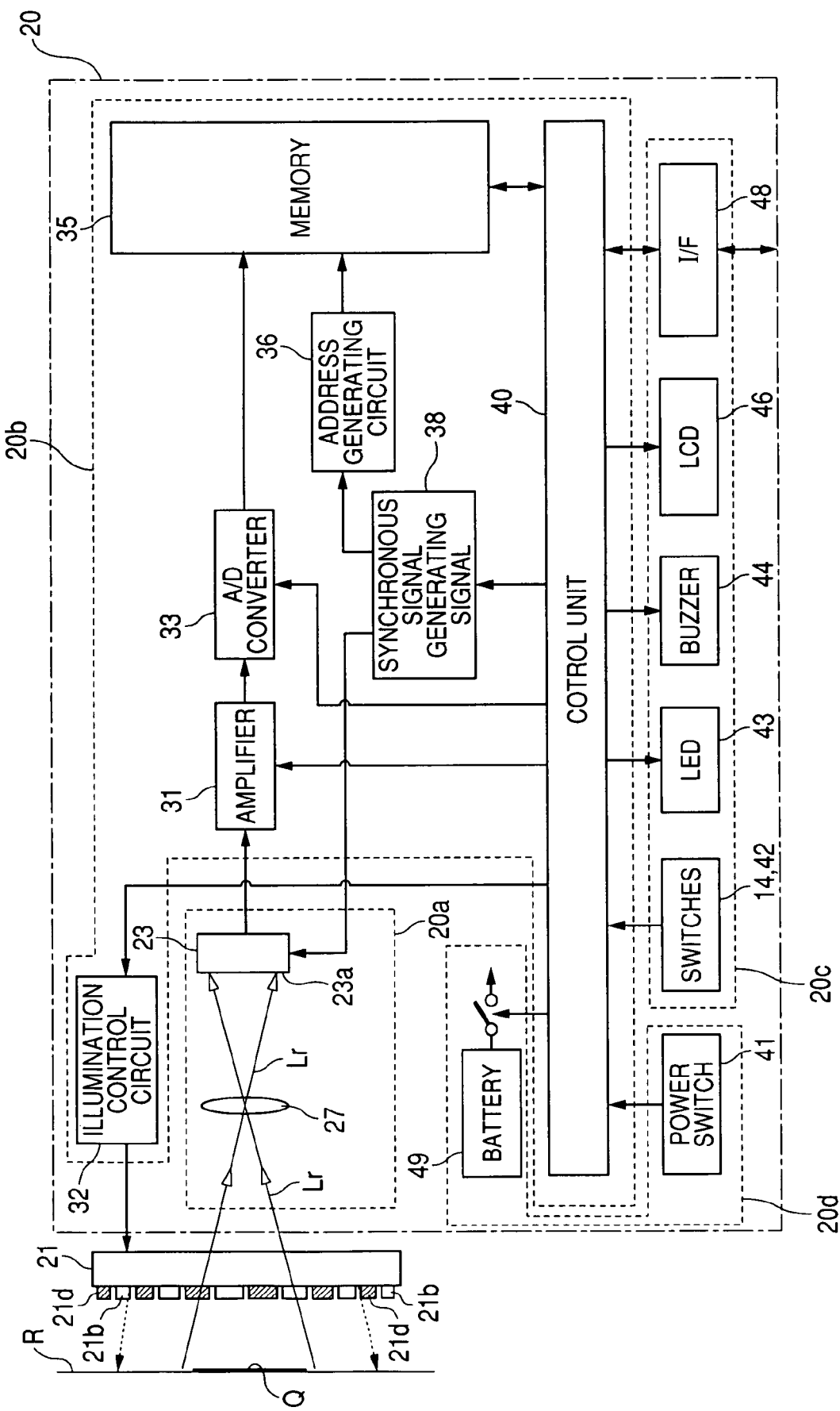
FIG. 2 is a block diagram of a control unit disposed in the reader shown in FIG. 1.

FIG. 1 is a side view, with portions broken away for clarity, of a handy type information optical reader according to the first embodiment of the present invention, while FIG. 2 is a block diagram of a control section disposed in the reader.

As shown in FIG. 1, a handy gun type information optical reader 10 has a housing body 11 made round in a rectangular thinned box shape, and a cylindrical grip 12 attached to a bottom portion of the body 11 placed on a rear side of the reader 10 so as to be integrally formed with the body 11. The grip 12 has a specific outer diameter such that a user can grasp the grip 12 with his or her hand. A trigger switch 14 is attached to an upper portion of the grip 12 such that a forefinger of the user holding the grip 12 is placed on the switch 14.

The body 11 accommodates a controller 20 for controlling an operation of the reader 10. An illuminator 21 is disposed on the front side of the body 11. A reading opening 11a is formed near the illuminator 21. When the switch 14 is turned on, an instruction is transmitted to the controller 20, and the illuminator 21 emits light to an object under control of the controller 20. Light regularly or irregularly reflected on the object passes through the opening 11a and enters an optical system of the controller 20.

As shown in FIG. 1 and FIG. 2, the controller 20 has an optical system 20a disposed on a printed wiring board 16, a microcomputer system 20b disposed on a printed wiring board 15, an input/output system 20c disposed on the surfaces of the body 11 and the grip 12, and an electric power system 20d.

The optical system 20a has an image forming lens 27 and an image pickup sensor 23. The lens 27 is, for example, composed of a lens-barrel and a plurality of converging lenses disposed in the lens-barrel. The sensor 23 is formed of a monochrome area sensor which has several millions of solid imaging devices such as C-MOS or a charge coupled device (CCD) disposed in a two-dimensional arrangement. A light receiving surface 23f of the sensor 23 is placed so as to be seen from the front side of the reader 10 through the opening 11a.

An information code Q such as a Quick Response (QR) code is carved on an object R such as a glossy metallic plate or the like by means of the laser marking. However, the code Q may be printed on the object R such as a glossy or glazed paper or the like. When a user intends to read the information code Q by using the reader 10, the user places the reader 10 on the object R such that the illuminator 21 faces the code Q. The illuminator 21 illuminates the code Q, and light emitted from the illuminator 21 is reflected on the code Q. The reflected light Lr passes through the opening 11a, and the lens 27 converges the light Lr onto the surface 23f of the sensor 23. Therefore, a code image of the code Q is formed in the sensor 23.

The microcomputer system 20b has an illumination control circuit 32, an amplifier 31, an analog to digital (A/D) converter 33, a memory 35, a synchronous signal generating circuit 38, an address generating circuit 36, and a control unit 40 controlling the circuits 32 and 38, the amplifier 31 and the converter 33. The circuit 32 controls the illuminator 21 to illuminate the code Q. The circuit 38 generates a synchronous signal. The sensor 23 forms a code image in response to this signal in synchronization with the illumination of the illuminator 21. An image signal indicating the code image is transmitted from the sensor 23 to the amplifier 31. The amplifier 31 amplifies the signal at a predetermined gain. The A/D converter 33 converts the amplified signal into image data (or image information). The circuit 36 generates an address of the storing region in response to the synchronous signal of the circuit 38. The memory 35 stores the image data in an image storing region associated with the address.

The input/output system 20c has the switch 14, control switches 42 including control switches for the illuminator 21, a light emitting diode (LED) 43 acting as an indicator, a buzzer 44 generating a beep or alarm sound, a liquid crystal display (LCD) 46 and a communication interface (I/F) 48. The electric power system 20d has a power switch 41 disposed on the surface of the body 11 and a battery 49 disposed in the body 11. The battery 49 is a secondary battery and generates a predetermined direct current voltage. A lithium ion battery or the like is, for example, used as the battery 49.

The memory 35 is formed of a semiconductor memory such as a dynamic random access memory (DRAM), a static RAM (SRAM), an erasable and electrically programmable read only memory (EPROM), an electrically erasable programmable ROM (EEPROM) or the like. The memory 35 stores an image processing program and a system program used for controlling hard wares of the illuminator 21 and sensor 23.

The control unit 40 is formed of a microcomputer with a central processing unit (CPU), a system bus and an input-output interface so as to control the reader 10. The unit 40 and the memory 35 composes an information processor and have an information processing function. The unit 40 is connected with the circuits 31, 32, 33 and 38, the memory 35 and peripheral circuits (switches 14, 41 and 42, LED 43, buzzer 44, LCD 46 and interface 48) through the input-output interface. The unit 40 monitors and controls the switches 14, 41 and 42. The unit 40 controls the LED 43 to light on or off. The unit 40 controls the buzzer 44 to be turned on or off. The unit 40 controls the display 46 to display the information code Q. The unit 40 controls the interface 48 to perform a serial communication with external units (not shown). The unit 40 controls the switch 41 to be turned on or off, so that a driving electric power is supplied from the battery 49 to each of the circuits and elements of the reader 10 and stops this supply.

With this structure of the reader 10, when a user turns on the switch 41, self-diagnosis processing is automatically performed for the reader 10 under control of the unit 40 and is normally completed. When the user turns on the switch 14, the control unit 40 outputs a luminescence signal to the illuminator 21 through the circuit 32. In response to the luminescence signal, the illuminator 21 illuminates the information code Q, and light Lr reflected on the code Q is incident on the lens 27 through the opening 11a. Therefore, a code image is formed on the surface 23f of the sensor 23. Image pickup elements of the sensor 23 are exposed to the light Lr and detect this image. The detected image is transmitted to the memory 35 through the circuits 31 and 33 and is once stored in the memory 35 as image data. The image is displayed on the LCD 46.

Figure 3A:
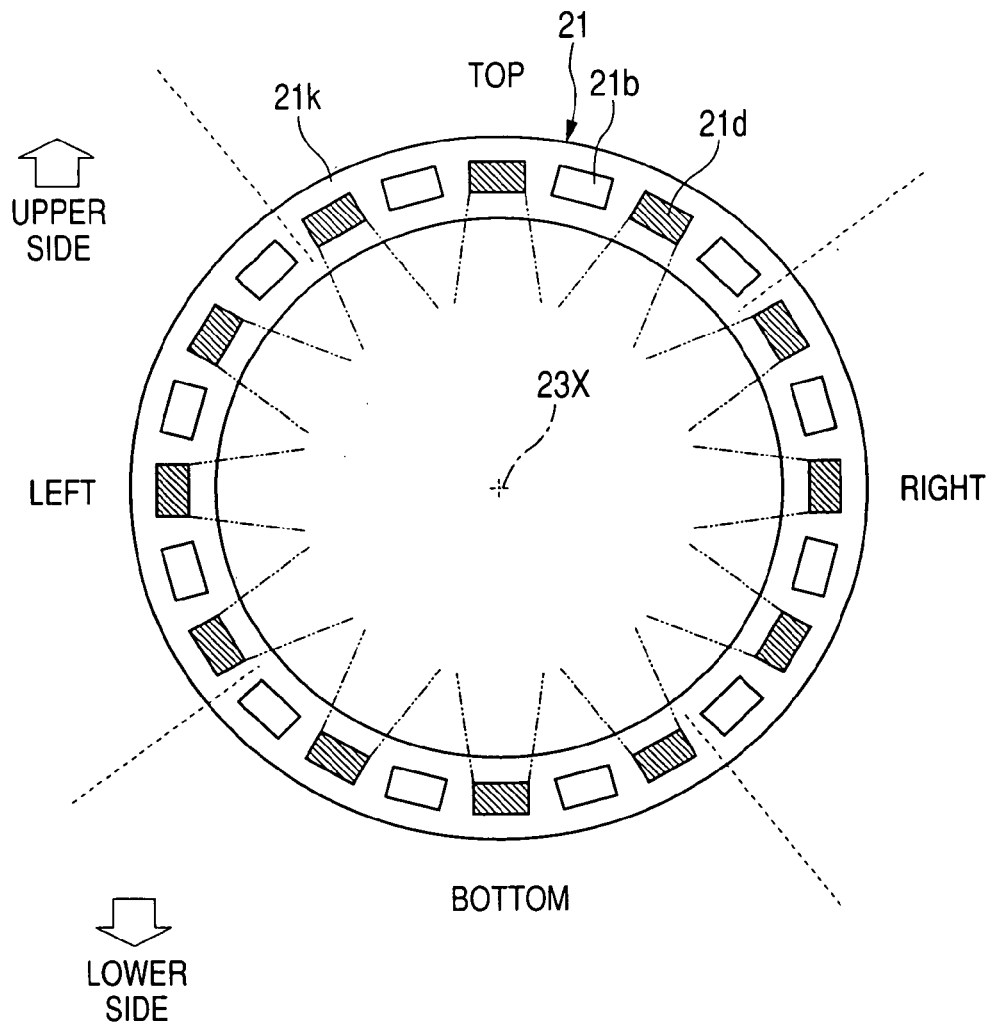
FIG. 3A is a front view of an illuminator of the reader shown in FIG. 1.
Figure 3B:
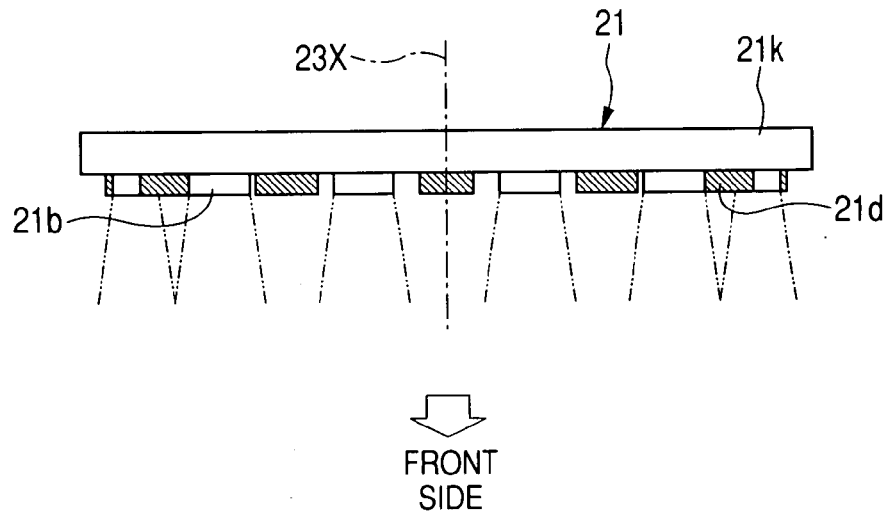
FIG. 3B is an enlarged upper view of an illuminator seen from an upper side of the reader shown in FIG. 1.
Figure 4:
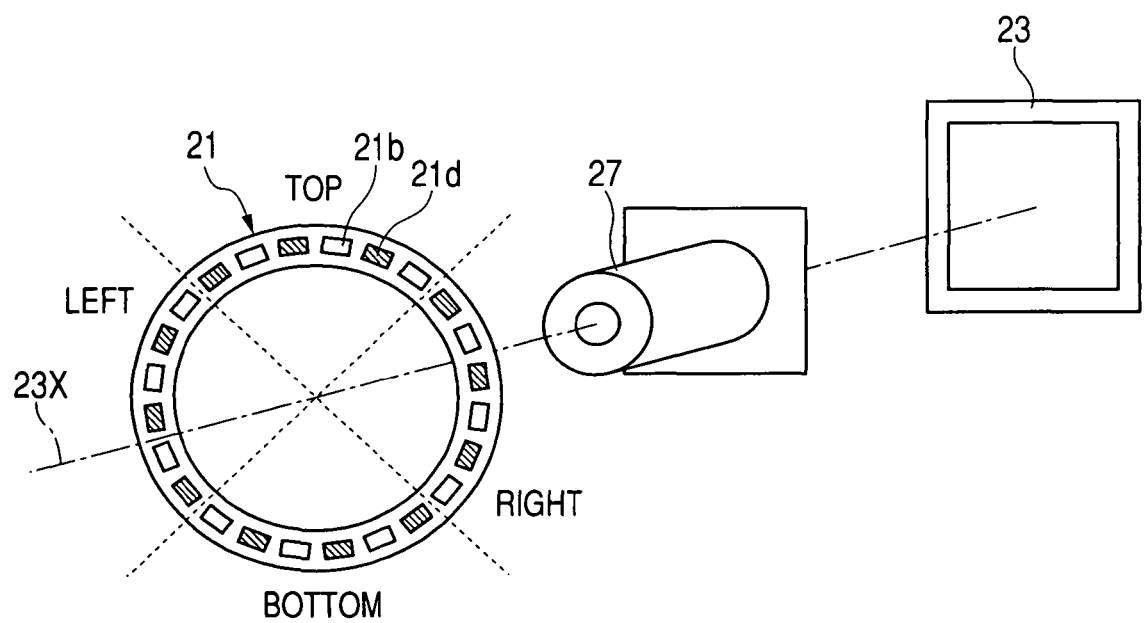
FIG. 4 is an explanatory view showing a positional relation among an illuminator, an image forming lens and a light receiving sensor disposed in the reader shown in FIG. 1.

Next, an operation of the illuminator 21 performed under control of the circuit 32 is described in detail with reference to FIG. 3A, FIG. 3B and FIG. 4. FIG. 3A is a front view of the illuminator 21 seen from the front side of the reader 10, while FIG. 3B is an upper view of the illuminator 21 seen from the upper side of the reader 10. FIG. 4 is an explanatory view showing a positional relation among the illuminator 21, the lens 27 and the sensor 23.

As shown in FIG. 3A and FIG. 3B, the illuminator 21 has a plurality of bright field illuminating units 21b acting as a bright field illuminator and a plurality of dark field illuminating units 21d acting as a dark field illuminator. The units 21b and the units 21d are alternately arranged on a front surface of a ring-shaped substrate 21k. The illuminator 21 is partitioned into four blocks (top, right, bottom and left blocks arranged clockwise in that order). Each block has three illuminating units 21b and three illuminating units 21d alternately arranged. Under control of the circuit 32, the four blocks of illuminating units 21b can be simultaneously lighted and can be lighted by turns, and the four blocks of illuminating units 21d can be simultaneously lighted and can be lighted by turns. The four blocks of illuminating units 21b and 21d may be simultaneously lighted and may be lighted by turns.

As shown in FIG. 4, the illuminator 21, the lens 27 and the sensor 23 are positioned such that an optical axis (or a received light center axis) 23X of the optical system 20a passes through the center of the lens 27, the center of the ring-shaped illuminator 21 and the center of the sensor 23. Therefore, the illuminating units 21b and 21d of the illuminator 21 are disposed in an area surrounding the optical axis 23X (called a view field surrounding area) A color changeable light composed of three side-face emission type light emitting diodes (LEDs) is used as each illuminating unit 21d, while a color changeable light composed of three front-face emission type LEDs is used as each illuminating unit 21b.

As shown in FIG. 3A, each illuminating unit 21d emits a dark field illumination light toward the optical axis 23X (i.e., the center of the illuminator 21) along a radial direction of the illuminator 21 at a predetermined divergent angle while slightly shifting the light toward the front side (i.e., toward the information code). That is, the illuminating units 21d emit lights at an oblique luminous angle to the information code Q to illuminate the code Q in the dark field illumination. More specifically, the lights are emitted to the information code Q in a slanting direction to the code Q and are irregularly reflected on the code Q. Then, the irregularly-reflected lights go to the sensor 23 through the lens 27. Because the illuminating units 21d are disposed in a ring shape so as to surround the optical axis 23X, the illumination directions of the lights to the information code differ from one another.

In contrast, as shown in FIG. 3B, each illuminating unit 21b emits a bright field illumination light along the optical axis 23X at a predetermined divergent angle while slightly shifting the light toward the optical axis 23X. That is, the illuminating units 21b emit lights substantially in parallel to the optical axis 23X at a perpendicular luminous angle to the information code Q. Therefore, the lights are emitted to the information code Q from the upper direction of the code Q and are regularly reflected on the code Q. Then, the regularly-reflected lights go to the sensor 23 through the lens 27. Therefore, the information code Q is intensely illuminated with the lights of the illuminating units 21b. The oblique luminous angle of the lights emitted from the illuminating units 21d is smaller than the perpendicular luminous angle of the lights emitted from the illuminating units 21b. Because the illuminating units 21b are disposed in a ring shape so as to surround the optical axis 23X, the illumination directions of the lights to the information code differ from one another.

Figure 5:
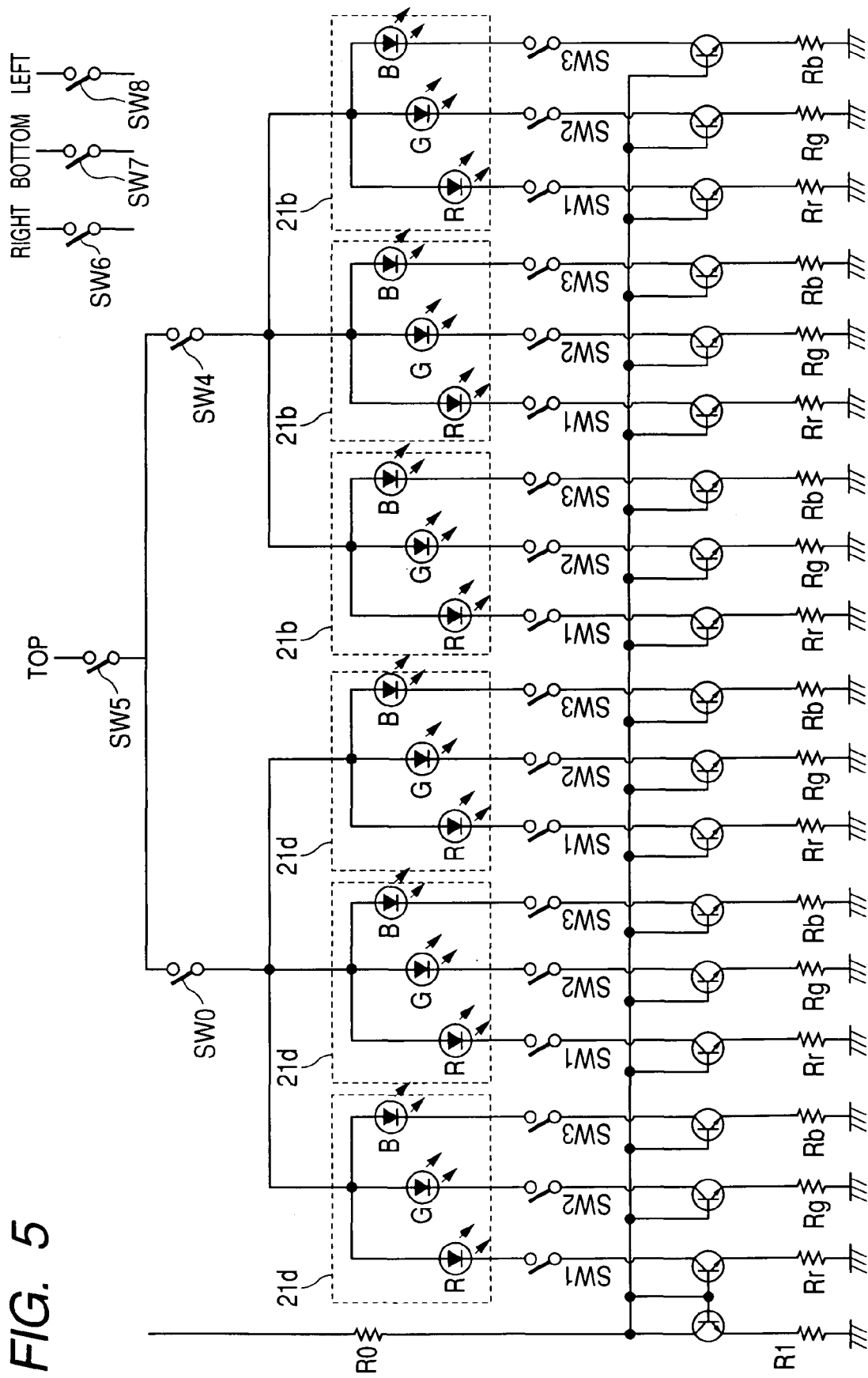
FIG. 5 is a view showing a structure of illuminating units of the illuminator shown in FIG. 3A.

FIG. 5 is a view showing a structure of the illuminating units 21b and 21d of the illuminator 21. In FIG. 5, the structure of the top block of illuminating units 21b and 21d is representatively shown, and each of the other blocks of the illuminating units 21b and 21d has the same structure as that shown in FIG. 5.

As shown in FIG. 5, each of the illuminating units 21b and 21d has a red light emitting diode (LED), a green LED, a blue LED, a switch SW0 or SW4, a switch SW1 for selecting the red LED, a switch SW2 for selecting the green LED, and a switch SW3 for selecting the blue LED. Further, the illuminator 21 has a switch SW5 for selecting the top block, a switch SW6 for selecting the right block, a switch SW7 for selecting the bottom block, and a switch SW8 for selecting the left block. Each red LED is earthed through a transistor and a resistor Rr. Each green LED is earthed through a transistor and a resistor Rg. Each blue LED is earthed through a transistor and a resistor Rb. Resistors R0 and R1 and a transistor are used to apply a voltage to gates of the transistors for the LEDs.

When the circuit 32 turns on the switches SW1 to SW3, each of the illuminating units 21b and 21d is ready to emit a white light. When the circuit 32 turns on the switch SW1 while turning off the switches SW2 and SW3, each of the illuminating units 21b and 21d is ready to emit a red light. When the circuit 32 turns on the switch SW2 while turning off the switches SW1 and SW3, each of the illuminating units 21b and 21d is ready to emit a green light. When the circuit 32 turns on the switch SW3 while turning off the switches SW1 and SW2, each of the illuminating units 21b and 21d is ready to emit a blue light. When the circuit 32 turns on the switches SW5 to SW8, all the blocks are selected. When the circuit 32 turns on the switch SW5, SW6, SW7 or SW8, the top, right, bottom or the left block is selected. When the circuit 32 turns on the switches SW0 and SW4, the selected block or blocks of illuminating units 21b and 21d are lighted. When the circuit 32 turns on the switch SW0 of the selected block or blocks, the selected block or blocks of illuminating units 21d are lighted. When the circuit 32 turns on the switch SW4 of the selected block or blocks, the selected block or blocks of illuminating units 21b are lighted. Further, each illuminating unit can emit each of mixed colors obtained from a mixture of red, green and blue.

Figure 6:
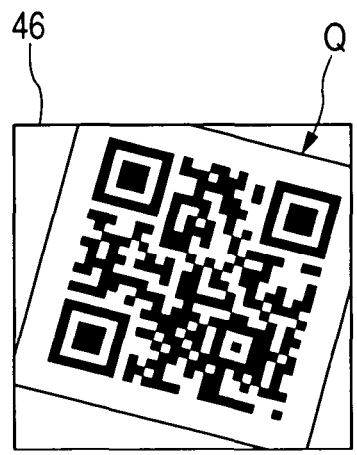
FIG. 6 shows an image of an information code displayed on a display in the reader shown in FIG. 1.

FIG. 6 shows an image of the information code Q displayed on the display 46. As shown in FIG. 6, the user can change one block of lighted illuminating units to another block while viewing the information code Q displayed on the display 46. Further, the user can select one of the dark and bright field illuminations while viewing the information code Q displayed on the display 46. Moreover, the user can change a luminous color of the illuminator 21 to another luminous color while viewing the information code Q displayed on the display 46.

In conclusion, in the first embodiment, the user manually selects all blocks or one of the top, left, bottom and right blocks, manually selects both of or one of the group of illuminating units 21b or the group of illuminating units 21d, and manually selects a luminous color of the illuminator 21. Then, the user manually lights the selected illuminating units while changing the selection. When the user selects and lights the illuminating units 21b, the information code Q is illuminated in the bright field illumination of the illuminating units 21b along a luminous direction substantially parallel to the optical axis 23X. In contrast, when the user selects and lights the illuminating units 21d, the information code Q is illuminated in the dark field illumination of the illuminating units 21d at the oblique luminous angle.

Therefore, to obtain a code image having a highest contrast, the user can specify at least one of the blocks, the illuminating units 21b and/or the illuminating units 21d, and a luminous color of the illuminator 21. Accordingly, the reader 10 can reliably read the information code Q directly marked on the object R regardless of a marking process such as printing or carving, a material of the object R and a color of the code Q.

Particularly, each of the illuminating units 21b and 21d can be lighted on in each of monochromatic colors such as red, green and blue. Therefore, even when the object R has any of various colors, the reader 10 can optically read the information code Q at the highest contrast by adjusting the luminous color of the illuminator 21. For example, when the information code Q set at red is printed on the object R, the illuminating units 21b or 21d are preferably set at red. Accordingly, the reader 10 can reliably read the information code Q regardless of the color of the code Q.

Further, the user can change the lighted illuminating units to the bright field illuminating units 21b or the dark field illuminating units 21d while viewing the code image displayed by the display 46. Accordingly, the reader 10 can reliably read the information code Q at the highest contrast. For example, when the information code Q is printed or carved on a glossy or glazed object, the reader 10 can reliably read the information code Q illuminated with the dark field illuminating units 21d without causing the mirror reflection.

Moreover, the illuminating units 21b and 21d are arranged around the view field surrounding area of the sensor 23 in a ring shape. Therefore, the reader 10 can uniformly illuminate the code Q along all directions to the code Q by selecting the illuminating units 21b and/or 21d of all the blocks. Accordingly, the reader 10 can optically read the information code Q directly marked on the object R at the highest contrast regardless of a marking process such as printing or carving, a material of the object R and a color of the code Q.

Furthermore, the reader 10 can light one block of illuminating units 21b and/or 21d selected from the blocks partitioned along a circumferential direction of the ring-shaped illuminator 21. Therefore, the reader 10 can illuminate the information code Q along a selected direction to the code Q so as to read the code Q at the highest contrast. Accordingly, even when the information code Q has a rough surface so as to change the reflectance to the incident light in dependent on the incident direction of the light to the code, the reader 10 can optically read the information code Q at the highest contrast.

Still further, the illuminating units 21b and the illuminating units 21d are disposed on the same substrate 21k. Accordingly, as compared with a case where the illuminating units 21b and the illuminating units 21d are disposed on different substrates, the structure of the reader 10 can be simplified.

Still further, the illuminating units 21b and the illuminating units 21d are alternately arranged on the same surface of the substrate 21K. Therefore, even when only the illuminating units 21b or only the illuminating units 21d are lighted, the illuminator 21 can uniformly illuminate the information code Q along all directions to the code Q. Accordingly, the reader 10 can optically read the information code Q at the highest contrast regardless of a marking process such as printing or carving or a material of the object R.

Modifications of First Embodiment

Figure 7A:
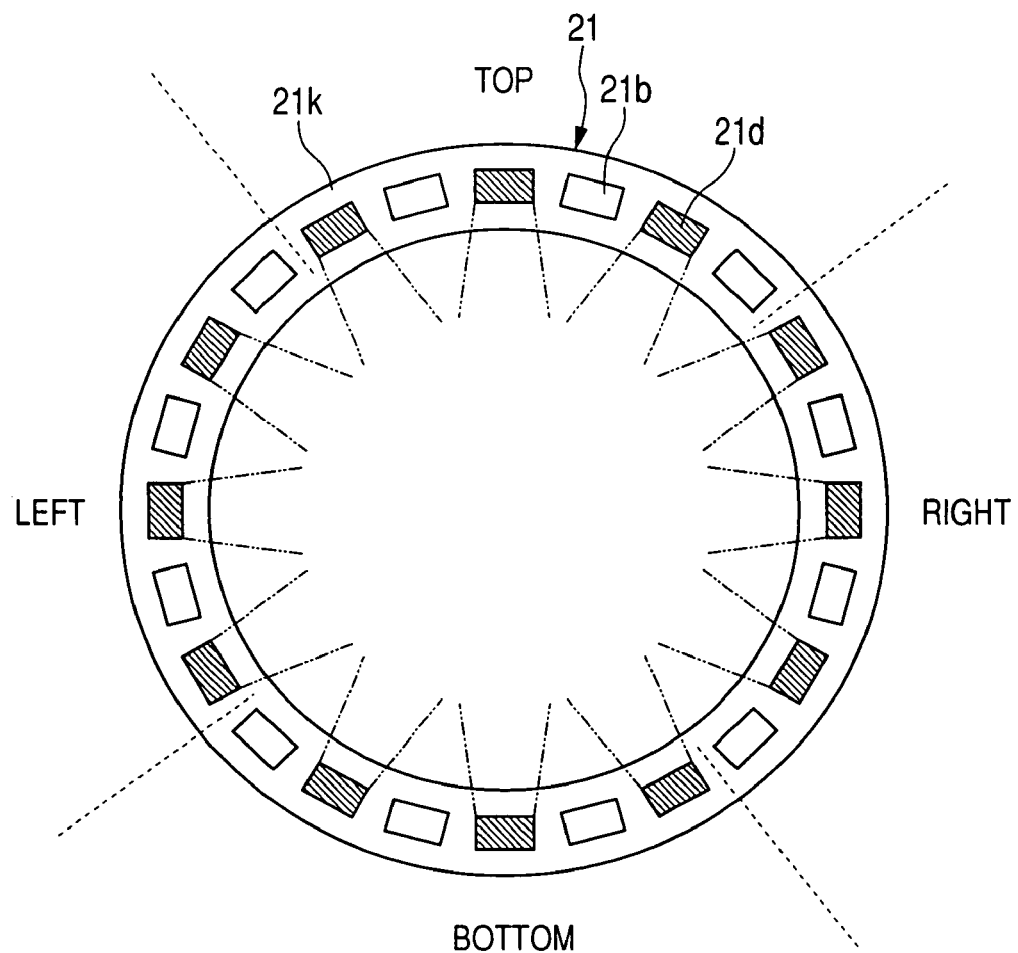
FIG. 7A is a front view of an illuminator of the reader according to a first modification of the first embodiment.
Figure 7B:
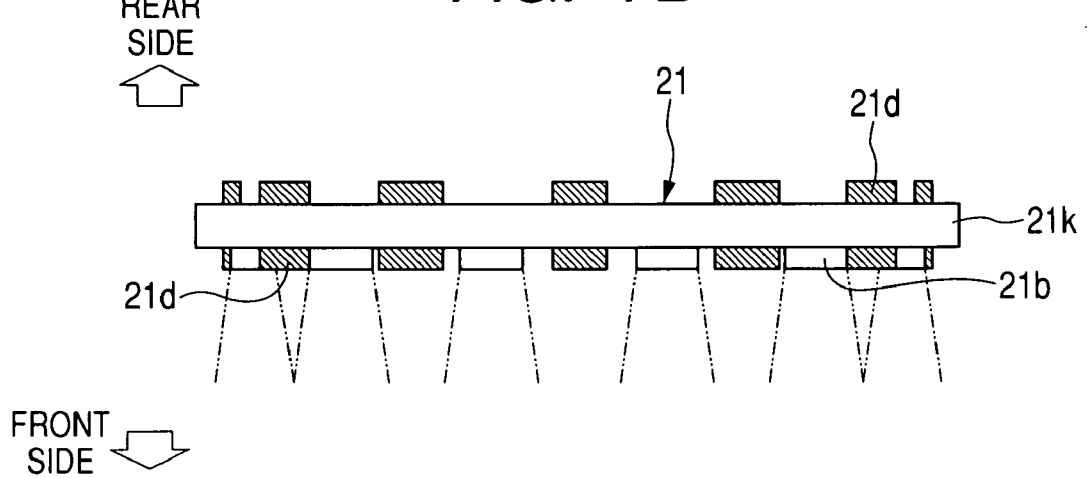
FIG. 7B is an upper view of the illuminator shown in FIG. 7A.

FIG. 7A is a front view of the illuminator 21 according to the first modification of the first embodiment, while FIG. 7B is an upper view of the illuminator 21.

As shown in FIG. 7A and FIG. 7B, the illuminator 21 differs from that shown in FIG. 3A and FIG. 3B in that the illuminator 21 further has other dark field illuminating units 21d on a rear surface of the substrate 21k.

With this structure of the reader 10, light emitted from the illuminating units 21d on the rear surface of the substrate 21k is irregularly reflected on the body 11 toward the information code Q. Therefore, the information code Q and an area surrounding the code Q are further flooded with this irregularly-reflected light.

Accordingly, the reader 10 can illuminate the information code Q at higher luminous intensity in the dark field illumination. Further, because all the illuminating units 21b and 21d are disposed on the same substrate 21k, the reader 10 can maintain the simplified structure.

Figure 8A:
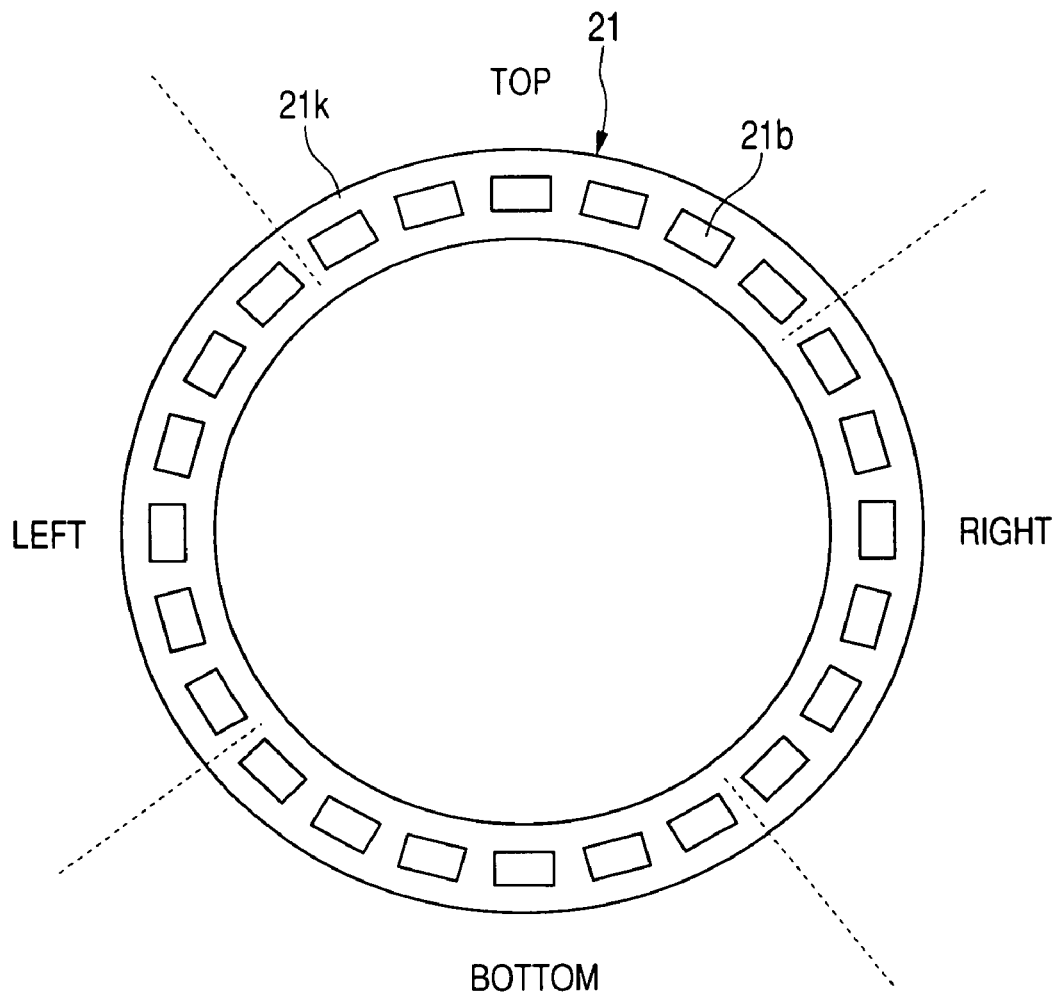
FIG. 8A is a front view of an illuminator of the reader according to a second modification of the first embodiment.
Figure 8B:
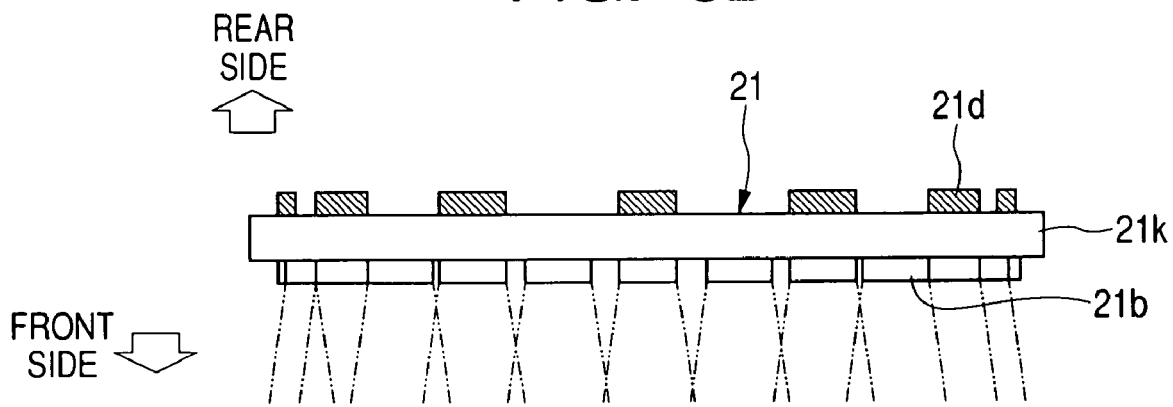
FIG. 8B is an upper view of the illuminator shown in FIG. 8A.

FIG. 8A is a front view of the illuminator 21 according to the second modification of the first embodiment, while FIG. 8B is an upper view of the illuminator 21.

As shown in FIG. 8A and FIG. 8B, the illuminator 21 has the bright field illuminating units 21b disposed at first intervals in a ring shape on the front surface of the substrate 21k, and the number of illuminating units 21b is twenty-four. The illuminator 21 further has the dark field illuminating units 21d disposed at second intervals in a ring shape on the rear surface of the substrate 21k, and the number of illuminating units 21d is twelve.

With this structure of the reader 10, the information code Q and an area surrounding the code Q are directly illuminated with the illuminating units 21b in the bright field illumination. In the dark field illumination, lights emitted from the illuminating units 21d are reflected on a surface of the body 11, and the information code Q and an area surrounding the code Q are indirectly illuminated with the reflected lights from an upper slanting direction.

Accordingly, because the illuminating units 21b and the illuminating units 21d are disposed on one substrate, the structure of the reader 10 can be simplified as compared with a case where the illuminating units 21b and the illuminating units 21d are disposed on different substrates.

Second Embodiment

Figure 9:
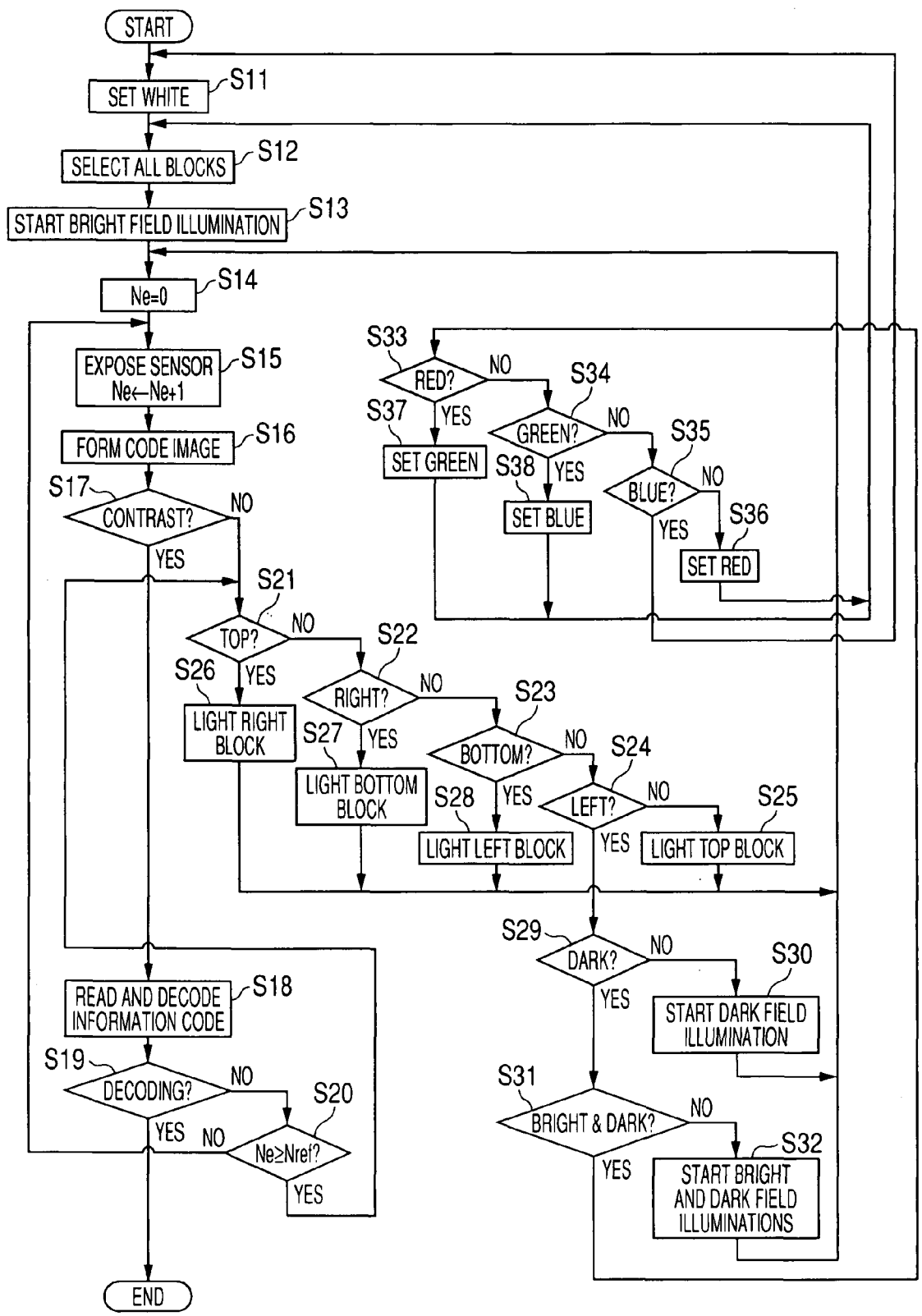
FIG. 9 is a flow chart showing the information code reading procedure of a handy type information optical reader according to the second embodiment.

FIG. 9 is a flow chart showing the information code reading procedure according to the second embodiment.

In the second embodiment, the control circuit 32 of the reader 10 selects the blocks by turns after selecting all blocks, alternately selects the illuminating units 21b and the illuminating units 21d, and selects illumination colors of light emitted from the selected block of illuminating units 21b or 21d by turns. These selections are automatically performed. Then, the reader 10 reads the information code Q each time the information code Q is illuminated with light of a selected color emitted from one selected block of illuminating units 21b or one selected block of illuminating units 21d. The control unit 40 controls the control circuit 32 to synchronize the lighting of each block of illuminating units 21b and/or 21d with an image formation of the sensor 23.

As shown in FIG. 9, at step S11, when the switch 14 is turned on, the illumination color of all illuminating units 21b and 21d is initially set at a white light. In other words, all switches SW1 to SW3 of all blocks shown in FIG. 5 are turned on. At step S12, all blocks of the illuminator 21 are initially selected. In other words, the switches SW5 to SW8 are turned on. Therefore, the illumination using all blocks of illuminating units 21b and/or 21d has been prepared.

At step S13, the illuminating units 21b of the selected block(s) are lighted, and the lighting-off of the illuminating units 21d is maintained. In other words, all switches SW4 are turned on, and the turning-off of all switches SW0 is maintained. Therefore, the bright field illumination for the code image Q is started. At step S14, an exposure repetition number Ne is initially set at zero.

At step S15, the sensor 23 is exposed to the light reflected on the information code Q, and the number Ne is incremented by one. At step S16, the sensor 23 forms a code image of the information code Q, and the control unit 40 performs a well-known image recognition to recognize the code image. The code image may display on the display 46.

At step S17, a contrast judging unit of the unit 40 judges whether or not a level of a contrast of the code image is equal to or higher than a predetermined contrast level. In case of an affirmative judgment, the code image is judged to have a superior contrast. Therefore, at step S18, a reading and decoding unit of the unit 40 reads the information code Q and decodes the code Q to code information. At step S19, it is judged whether or not the decoding is successfully performed. In case of an affirmative judgment, the code information is transmitted to a host processor (not shown), and this procedure is finished. In case of a negative judgment at step S19, the procedure returns to step S15 to again form a code image. When a contrast of the code image is not good (negative judgment at step S17) while repeating the formation of the code image by a reference number Nref (YES at step S20), the procedure proceeds to step S21.

At step S21, it is judged whether or not only the top block of illuminating units 21b and/or 21d is now lighted. In other words, it is judged whether or not the switch SW5 is on while the turning-off of the switches SW6 to SW8 is maintained. In case of a negative judgment, it is judged at step S22 whether or not only the right block of illuminating units 21b and/or 21d is now lighted. In other words, it is judged whether or not the switch SW6 is on while the turning-off of the switches SW5, SW7 and SW8 is maintained. In case of a negative judgment, it is judged at step S23 whether or not only the bottom block of illuminating units 21b and/or 21d is now lighted. In other words, it is judged whether or not the switch SW7 is on while the turning-off of the switches SW5, SW6 and SW8 is maintained. In case of a negative judgment, it is judged at step S24 whether or not only the left block of illuminating units 21b and/or 21d is now lighted. In other words, it is judged whether or not the switch SW8 is on while the turning-off of the switches SW5 to SW7 is maintained. In case of a negative judgment, it is recognized that the illumination based on all blocks of lighting units has been finished without successfully obtaining code information, so that the procedure proceeds to step S25.

At step S25, only the top block of illuminating units 21b and/or 21d is lighted. In other words, the switches SW6 to SW8 are turned off while the switch SW5 stands turned on. Therefore, the illumination based on the top block of illuminating units is started as a first pattern of illumination. Then, the procedure returns to step S14. When a code image with a superior contrast is formed in the first pattern of illumination at step S16 and is successfully decoded at steps S18 and S19, the procedure is completed. In contrast, when no code information is obtained at steps S18 and S19, an affirmative judgment is made at step S21, so that the procedure proceeds to step S26.

At step S26, only the right block of illuminating units 21b and/or 21d is lighted. In other words, the switch SW5 is turned off, and the switch SW6 is turned on while the switches SW7 and SW8 stand turned off. Therefore, the illumination based on the right block of illuminating units is started as a second pattern of illumination. Then, the procedure returns to step S14. When a code image with a superior contrast is formed in the second pattern of illumination at step S16 and is successfully decoded at steps S18 and S19, the procedure is completed. In contrast, when no code information is obtained at steps S18 and S19, an affirmative judgment is made at step S22, so that the procedure proceeds to step S27.

At step S27, only the bottom block of illuminating units 21b and/or 21d is lighted. In other words, the switch SW6 is turned off, and the switch SW7 is turned on while the switches SW5 and SW8 stand turned off. Therefore, the illumination based on the bottom block of illuminating units is started as a third pattern of illumination. Then, the procedure returns to step S14. When a code image with a superior contrast is formed in the third pattern of illumination at step S16 and is successfully decoded at steps S18 and S19, the procedure is completed. In contrast, when no code information is obtained at steps S18 and S19, an affirmative judgment is made at step S23, so that the procedure proceeds to step S28.

At step S28, only the left block of illuminating units 21b and/or 21d is lighted. In other words, the switch SW7 is turned off, and the switch SW8 is turned on while the switches SW5 and SW6 stand turned off. Therefore, the illumination based on the left block of illuminating units is started as a fourth pattern of illumination. Then, the procedure returns to step S14. When a code image with a superior contrast is formed in the fourth pattern of illumination at step S16 and is successfully decoded at steps S18 and S19, the procedure is completed. In contrast, when no code information is obtained at steps S18 and S19, an affirmative judgment is made at step S24, so that the procedure proceeds to step S29.

At step S29, it is judged whether or not only the illuminating units 26d are lighted. In other words, it is judged whether or not the switch SW0 of the left block has been turned on. In case of a negative judgment, it is recognized that the bright field illumination at the light of the selected color has been finished without successfully obtaining code information. Therefore, at step S30, the dark field illumination for the information code Q is started. More specifically, all blocks of illuminating units 26*d* are lighted, and the left block of illuminating units 26*b* are lighted off. In other words, the switches SW4 of all blocks are turned off, and the switches SW0 of all blocks and the switches SW5 to SW7 are turned on while the switch SW8 is maintained at the on state. Then, the procedure returns to step S14. When a code image with a superior contrast is formed in the dark field illumination at step S16 and is successfully decoded at steps S18 and S19, the procedure is completed. In contrast, when no code information is obtained at steps S18 and S19, an affirmative judgment is made at step S29. Then, the procedure proceeds to step S31.

At step S31, it is judged whether or not the illuminating units 26*b* and 26*d* are lighted. In other words, it is judged whether or not the switches SW0 and SW4 of the left block have been turned on. In case of a negative judgment, it is recognized that the dark field illumination at the light of the selected color has been finished without successfully obtaining code information. Therefore, at step S32, the bright and dark field illuminations simultaneously performed is started. More specifically, all blocks of illuminating units 26*b* and 26*d* are lighted. In other words, the switches SW4 of all blocks and the switches SW5 to SW7 are turned on while the switch SW8 and switches SW0 of all blocks stand turned on. Then, the procedure returns to step S14. When a code image with a superior contrast is formed at step S16 and is successfully decoded at steps S18 and S19, the procedure is completed. In contrast, when no code information is obtained at steps S18 and S19, an affirmative judgment is made at step S31. Then, the procedure proceeds to step S33.

At step S33, it is judged whether or not the illumination color of the illuminator 21 is set at red. In case of a negative judgment, it is judged at step S34 whether or not the illumination color is set at green. In case of a negative judgment, it is judged at step S35 whether or not the illumination color is set at blue. In case of a negative judgment, it is recognized that the bright and dark field illuminations separately and simultaneously performed by the white light has been finished without successfully obtaining code information. Therefore, to illuminate the information code Q with a red light, at step S36, the color of all illuminating units 21*b* and 21*d* is set at red. In other words, the switches SW2 and SW3 of all blocks are turned off while the switches SW1 of all blocks are maintained at the on state. Then, the procedure returns to step S12. When a code image with a superior contrast is formed at step S16 and is successfully decoded at steps S18 and S19, the procedure is completed. In contrast, when no code information is obtained at steps S18 and S19, an affirmative judgment is made at step S33. Then, the procedure proceeds to step S37.

At step S37, to illuminate the information code Q with a green light, the illumination color of all illuminating units 21*b* and 21*d* is set at green. In other words, the switches SW2 of all blocks are turned on, and the switches SW0 of all blocks are turned off while the switches SW3 of all blocks are maintained at the off state. Then, the procedure returns to step S12. When a code image with a superior contrast is formed at step S16 and is successfully decoded at steps S18 and S19, the procedure is completed. In contrast, when no code information is obtained at steps S18 and S19, an affirmative judgment is made at step S34. Then, the procedure proceeds to step S38.

At step S38, to illuminate the information code Q with a blue light, the illumination color of all illuminating units 21*b* and 21*d* is set at blue. In other words, the switches SW3 of all blocks are turned on, and the switches SW2 of all blocks are turned off while the switches SW1 of all blocks are maintained at the off state. Then, the procedure returns to step S12. When a code image with a superior contrast is formed at step S16 and is successfully decoded at steps S18 and S19, the procedure is completed. In contrast, when no code information is obtained at steps S18 and S19, an affirmative judgment is made at step S35. Then, the procedure returns to step S11. Therefore, this information code reading procedure is repeated until code information is obtained or the switch 14 is turned off.

As described above, each time the control circuit 32 automatically selects the blocks of illuminating units by turns while alternately selecting the bright field illumination and the dark field illumination and selecting illumination colors of light one by one, the control circuit 32 judges whether or not a code image of the information code Q has a superior contrast. Accordingly, a code image having a superior contrast can reliably obtained, so that the reader 10 can reliably read code information of the information code Q from the code image.

Third Embodiment

In the third embodiment, to suppress an adverse influence of a mirror reflection on a code image, the reader 10 has a plurality of sets of lens and sensor having different optical axes. When a code image receiving the influence of the mirror reflection is formed in each of the sensors, a combined code image having no influence of the mirror reflection is formed from the code images receiving the influence of the mirror reflection.

Figure 11A:
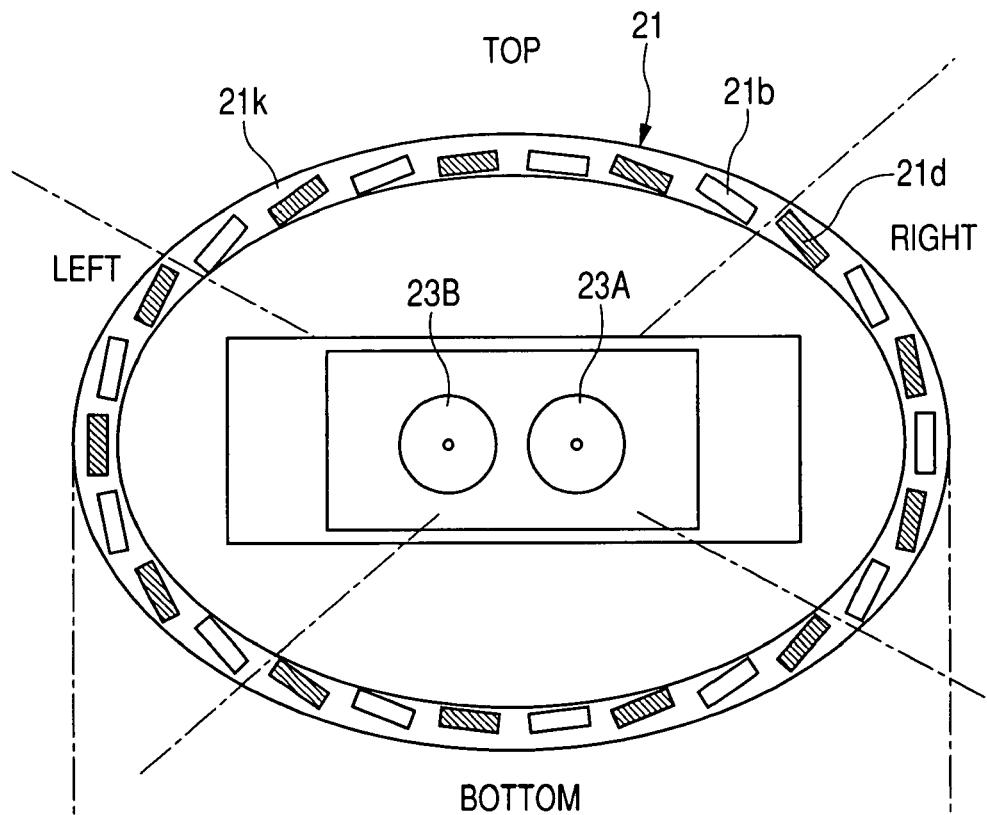
FIG. 11A is a front view of an illuminator and two sensors of an optical system shown in FIG. 10.
Figure 11B:
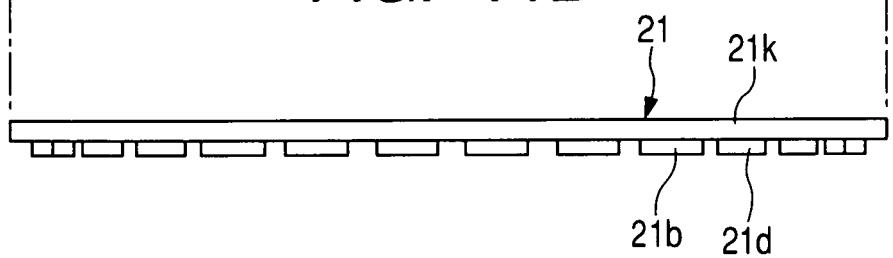
FIG. 11B is a top view of the illuminator shown in FIG. 11A.
Figure 11C:
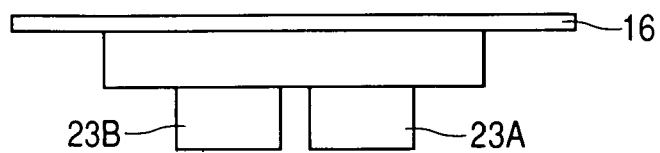
FIG. 11C is a top view of the sensors shown in FIG. 11A.

FIG. 10 is a block diagram of a control section of a handy type information optical reader according to the third embodiment. FIG. 11A is a front view of an illuminator and two sensors of the optical system. FIG. 11B is a top view of the illuminator, while FIG. 11C is a top view of the sensors.

As shown in FIG. 10, FIG. 11A, FIG. 11B and FIG. 11C, an information optical reader 10A has an illuminator 21A and a controller 20A. The illuminator 21A differs from the illuminator 21 only in that the illuminator 21A is formed in an elliptic cylinder shape. The elliptic shape of illuminator 21A has a major axis along a lateral direction of the reader 10A. The substrate 21*k* is formed in an elliptic shape, so that the illuminating units 21*b* and 21*d* are alternately arranged in the elliptic shape. In the same manner as in the first embodiment, the illuminator 21A is partitioned into the top, right, bottom and left blocks.

Each illuminating unit 21*d* is disposed so as to emit light toward a center axis Xc of the illuminator 21A along a radial direction of the illuminator 21A at a predetermined divergent angle while slightly shifting the light toward the front side (i.e., toward the information code). That is, each illuminating unit 21*d* emits light at an oblique luminous angle to the information code Q. In contrast, each illuminating unit 21*b* emits light along the center axis Xc at a predetermined divergent angle while slightly shifting the light toward the center axis Xc. That is, each illuminating unit 21*b* emits a light substantially in parallel to the center axis Xc at a perpendicular luminous angle to the information code Q.

The controller 20A has an optical system, a microcomputer system, the input/output system and the electric power system. The optical system has a pair of image forming lenses 27A and 27B aligned along the lateral direction and a pair of light receiving sensors 23A and 23B. Each of the lenses 27A and 27B has the same structure as that of the lens 27. Each of the sensors 23A and 23B has the same structure as that of the sensor 23. The lens 27A and the sensor 23A are disposed such that a center axis Xa of an image forming area (i.e., front surface) 23a1 of the sensor 23A and a center axis Xd of the lens 27A are shifted from the center axis Xc toward the right block of the illuminator 21A. The lens 27B and the sensor 23B are disposed such that a center axis Xb of an image forming area (i.e., front surface) 23b1 of the sensor 23B and a center axis Xe of the lens 27B are shifted from the center axis Xc toward the left block of the illuminator 21A. A light Lr reflected on the code information Q passes through the opening 11a and is refracted in each of the lenses 27A and 27B. The light Lr refracted in the lens 27A is converged onto the surface 23a1 of the sensor 23A, so that a code image of the code information Q is formed in the sensor 23A. The light Lr refracted in the lens 27B is converged onto the surface 23b1 of the sensor 23B, so that a code image of the code information Q is formed in the sensor 23B.

The microcomputer system of the controller 20a has amplifiers 31a and 31b, A/D converters 33a and 33b, address generating circuits 36a and 36b, synchronization signal generating circuits 38a and 38b, the memory 35 and the control unit 40. In the same manner as in the first embodiment, a code image formed in the sensor 23A is processed in the amplifier 31a and the converter 33a and is stored in an address of the memory 35 specified by the circuit 36a as image data in response to a synchronization signal of the circuit 38a. A code image formed in the sensor 23B is processed in the amplifier 31b and the converter 33b and is stored in an address of the memory 35 specified by the circuit 36b as image data in response to a synchronization signal of the circuit 38b.

A positional relation among the illuminator 21A, the lenses 27A and 27B and the sensors 23A and 23B is described with reference to FIG. 12 and FIG. 13.

Figure 12:
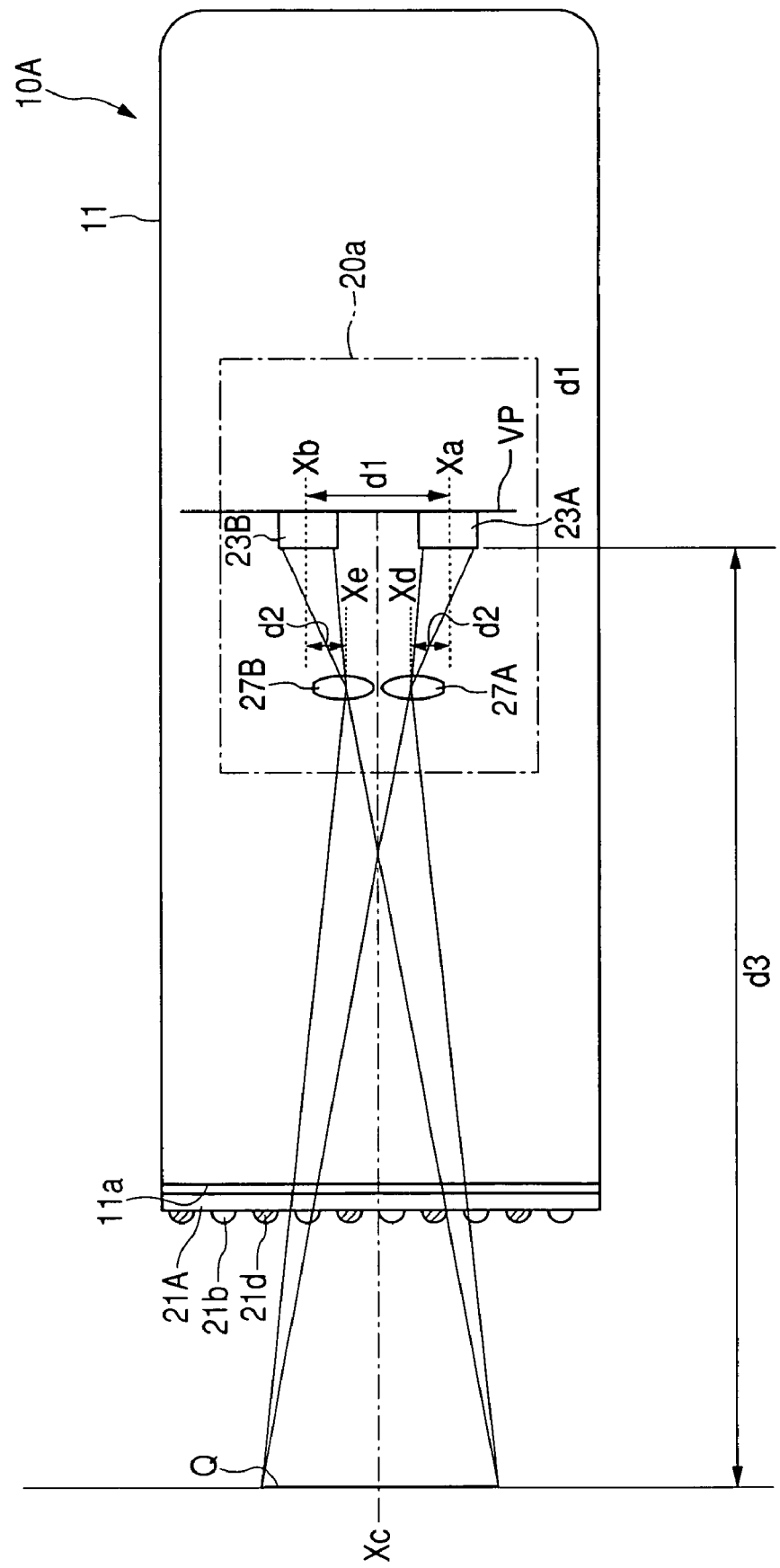
FIG. 12 is an explanatory view showing the formation of two code images in an optical system shown in FIG. 10.
Figure 13:
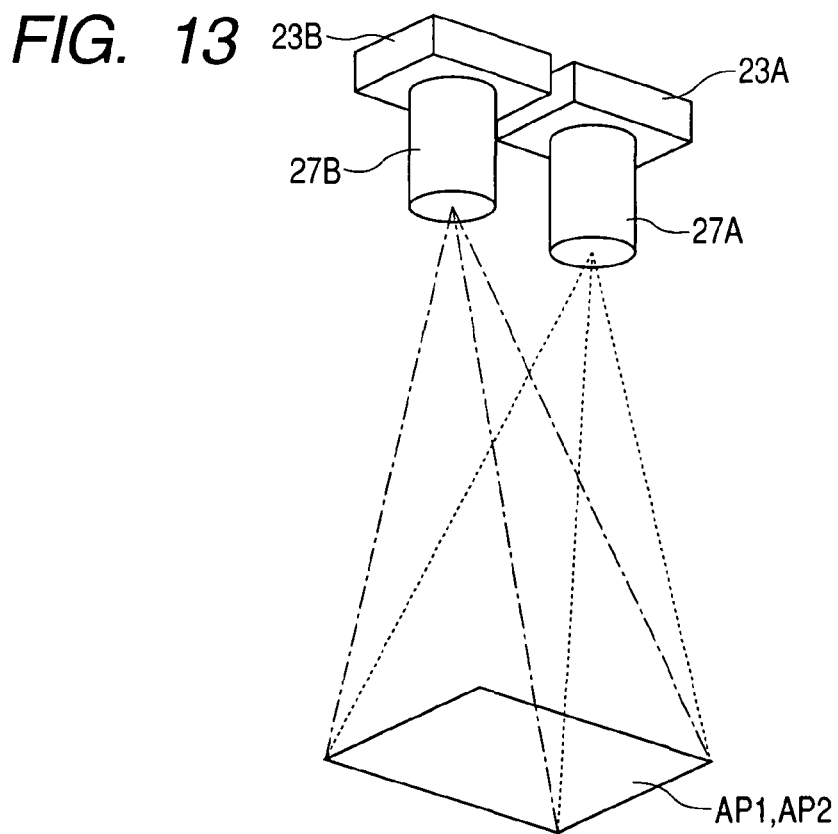
FIG. 13 is an explanatory view showing photographed areas of the sensors coinciding with each other.

FIG. 12 is an explanatory view showing the formation of two code images in the optical system according to the third embodiment, while FIG. 13 is an explanatory view showing photographed areas of the sensors 23A and 23B coinciding with each other.

As shown in FIG. 12, each of the sensors 23A and 23B is disposed on the board 15 to be placed on an imaginary plane VP perpendicular to the center axis Xc of the illuminator 21A, so that each of the center axes Xa and Xb of the sensors 23A and 23B becomes parallel to the center axis Xc. The sensors 23A and 23B are placed such that the center axes Xa and Xb away from each other by a distance d1 are symmetric with each other with respect to the center axis Xc. The lenses 27A and 27B are disposed such that the center axes Xd and Xe of the lenses 27A and 27B become parallel to the center axis Xc and are placed near the center axis Xc as compared with the center axes Xa and Xb. A distance d2 between the center axes Xa and Xd is equal to a distance between the center axes Xb and Xe. The distance d2 is determined such that, when the center of the information code Q is disposed on the center axis Xc at a distance d3 from the image forming areas 23a1 and 23b1 of the sensors 23A and 23B, an image of the information code Q is formed on each of the whole image forming areas 23a1 and 23b1. In other words, as shown in FIG. 13, the lenses 27A and 27B are positioned such that a photographed area Ap1 of the sensor 23A coincides with a photographed area Ap2 of the sensor 23B.

Therefore, when the reader 10A is disposed over the information code Q almost at the distance d3 from the areas 23a1 and 23b1 such that the center axis Xc of the illuminator 21A is almost placed at the center of the information code Q, each of the sensors 23A and 23B can be preferably focused on the information code Q so as to almost place an image of the center portion of the code Q in the center of the code image of the code Q.

Figure 14:
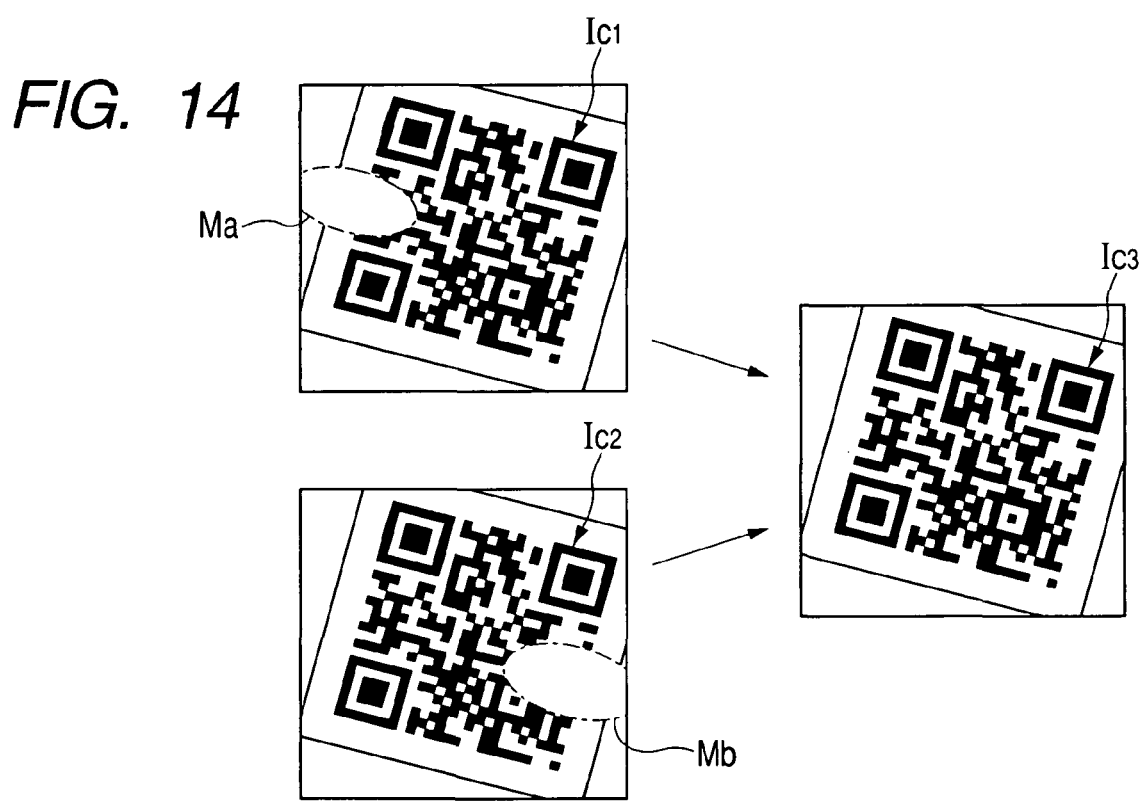
FIG. 14 is an explanatory view showing corrections on a code image according to the third embodiment.

FIG. 14 is an explanatory view showing corrections on a code image receiving an influence of a mirror reflection. In FIG. 14, a code image Ic1 of the QR code Q is formed in the sensor 23A, and a code image Ic2 of the QR code Q is formed in the sensor 23B. A code image Ic3 is formed in the control unit 40 by combining the code images Ic1 and Ic2 with each other.

As shown in FIG. 14, the code image Ic1 has an unclear portion Ma resulting from a mirror reflection on a first area of the QR code Q, and the code image Ic2 has another unclear portion Mb resulting from a mirror reflection on a second area of the QR code Q. Because the optical path of the reflected light Lr to the sensor 23A differs from the optical path of the reflected light Lr to the sensor 23B, the light Lr mirror-reflected on the first area of the QR code Q does not reach the sensor 23B, and the light Lr mirror-reflected on the second area of the QR code Q does not reach the sensor 23A. Therefore, the first area of the QR code Q corresponding to the unclear portion Ma differs from the second area of the QR code Q corresponding to the unclear portion Mb. In this embodiment, image data corresponding to the first area of the QR code Q is extracted from the code image Ic2, and the code image Ic1 is corrected to the code image Ic3 by replacing image data of the unclear portion Ma in the code image Ic1 with the extracted image data. Therefore, the code image Ic3 having no unclear portions resulting from mirror reflections can be obtained.

An example of corrections on a code image with an unclear portion caused by mirror reflections is described with reference to FIG. 15A to FIG. 15F. FIG. 15A is a view schematically showing a code image of the QR code Q formed in the sensor 23A, while FIG. 15B is a view schematically showing a code image of the QR code Q formed in the sensor 23B.

The QR code Q used as an information code is expressed by an arrangement of black and white cells (13 cells×13 cells) which are longitudinally and laterally disposed in a square shape. As shown in FIG. 15A and FIG. 15B, a positioning mark QP is placed at each of three corners among four corners of the QR code Q, and a vertex detecting cell QT colored black is placed at the remaining corner. A reader first detects the three marks QP and then detects the cell QT on the basis of the positions of the marks QP. Therefore, the reader can recognize an area of the QR code Q. Because the sensors 23A and 23B are placed to be shifted from the center axis Xc (see FIG. 12), the sensor 23A forms a code image Ic1 of the QR code Q shown in FIG. 15A, and the image Ic1 is distorted as shown in FIG. 15A so as to have a narrowed right portion and a widened left portion. In contrast, the sensor 23B forms a code image Ic2 of the QR code Q shown in FIG. 15B, and the image Ic2 is distorted so as to have a narrowed left portion and a widened right portion.

FIG. 15C shows a matrix of cells in the code image Ic1 detected by the sensor 23A, while FIG. 15D shows a matrix of cells in the code image Ic2 detected by the sensor 23B.

In the same manner as in the QR code, each of the code images Ic1 and Ic2 formed in the sensors 23A and 23B is partitioned into a plurality of cells (13 cells×13 cells) longitudinally and laterally arranged in a square shape to indicate each white or black cell of the QR code Q by a digital illumination level set for the corresponding cell of the code image. As shown in FIG. 15C and FIG. 15D, remarked cells 1-5, 1-6, 2-5, and 2-6 in each of the code images Ic1 and Ic2 correspond to the first area of the QR code Q, and an unclear portion Ma of the code image Ic1 receiving an influence of mirror reflections is placed at the remarked cells. An unclear portion Mb of the code image Ic2 receiving an influence of mirror reflections is placed at cells other than the remarked cells.

Each of the converters 33a and 33b gives a digital illumination level to each cell of a code image in response to a brightness of light reflected on the corresponding cell of the QR code Q and reaching the corresponding sensor. The illumination level ranges from 0 to 255 and is increased with the brightness of light. In the control unit 40, when a cell of a code image is set at the illumination level equal to or lower than a threshold value (e.g., 50), it is judged that the corresponding cell of the QR code Q is black. In contrast, when a cell of a code image is set at the illumination level higher than the threshold value, it is judged that the corresponding cell of the QR code Q is white.

FIG. 15E shows digital illumination levels set for cells of the code image Ic1 corresponding to the first area of the QR code Q, while FIG. 15F shows digital illumination levels set for cells of the code image Ic2 corresponding to the first area of the QR code Q.

As shown in FIG. 15E, because an influence of mirror reflections caused on the first area of the code Q is exerted on the remarked cells of the code image Ic1, each of the remarked cells 1-5, 1-6, 2-5 and 2-6 is set at the highest illumination level of 255. Therefore, regardless of actual colors of the first area of the QR code Q, it is judged that the first area of the QR code Q is colored white. In contrast, as shown in FIG. 15F, because no influence of mirror reflections is exerted on the remarked cells of the code image Ic2, each of the remarked cells 1-5, 1-6, 2-5 and 2-6 is set at a normal illumination level lower than a predetermined upper value. In this example, each of the remarked cells 1-5 and 1-6 is set at an illumination level of 78, and each of the remarked cells 2-5 and 2-6 is set at an illumination level of 25 or 24. Therefore, in response to actual colors of the first area of the QR code Q, it is judged that the cells 1-5 and 1-6 of the QR code Q is colored white, while the cells 2-5 and 2-6 of the QR code Q is colored block.

Figure 16:
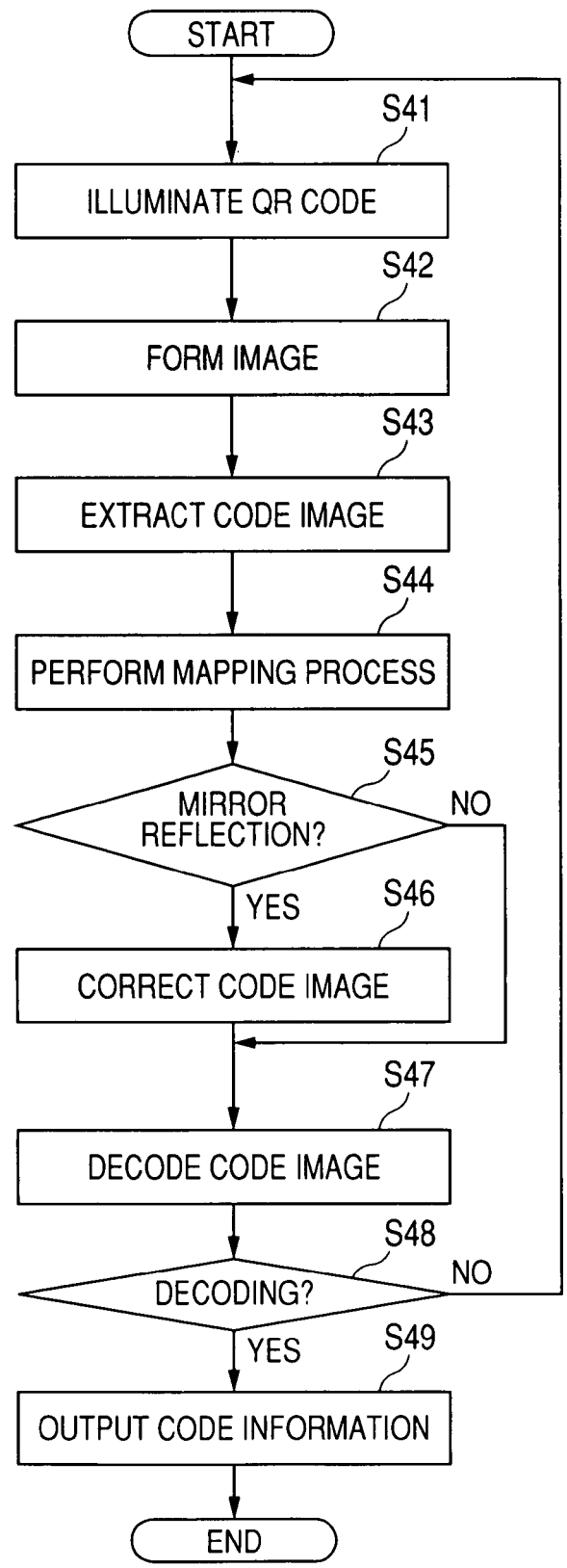
FIG. 16 shows a flow chart showing the processing for reading, correcting and decoding a QR code according to the third embodiment.

An operation for correcting the code image Ic1 in the control unit 40 is described with reference to FIG. 16. FIG. 16 shows a flow chart showing the processing for reading, correcting and decoding the QR code Q in the reader 10A.

As shown in FIG. 16, at step S41, one block of illuminating units 21b or 21d illuminates the QR code Q and an area surrounding the code Q, and each of the sensors 23A and 23B receives the reflected light Lr. At step S42, an image containing a code image of the QR code Q is formed in each of the sensors 23A and 23B. These images are simultaneously formed.

At step S43, the control unit 40 extracts an analog code image of the QR code Q from each of the images on the basis of the marks QP and the detecting cell QT. At step S44, the control unit 40 performs a mapping process by controlling the converters 33a and 33b to convert a brightness of light in each cell of one code image into a digital illumination level for each code image. Therefore, each code image is indicated by illumination levels distributed in a matrix of 13 cells×13 cells.

At step S45, the control unit 40 searches the code image Ic1 for cells receiving an influence of mirror reflections, and the unit 40 judges whether or not mirror reflections occur in the code image Ic1. When no cell of the code image Ic1 is set at the highest illumination level (negative judgment at step S45), the procedure jumps to step S47. In contrast, when remarked cells corresponding to a first area of the QR code Q are set at the highest illumination level in the code image Ic1 (affirmative judgment at step S45), the control unit 40 judges that mirror reflections occur in the first area so as to receive an influence of the mirror reflections in the remarked cells. At step S46, the control unit 40 corrects an unclear portion of the code image Ic1 resulting from the mirror reflections to form a corrected code image (i.e., code image Ic3 shown in FIG. 14) having no unclear portion. In other words, the control unit 40 replaces illumination levels set at the remarked cells of the code image Ic1 with illumination levels in the remarked cells of the code image Ic2 corresponding to the first area of the QR code Q.

At step S47, the corrected code image or the code image receiving no influence of mirror reflections is decoded to code information. In other words, an arrangement of white and black cells is formed as code information on the basis of the illumination levels of the corrected code image. At step S48, it is judged whether or not the decoding of the corrected code image is successfully executed. In case of a negative judgment, the procedure returns to step S41. In contrast, when the decoding is successfully executed, code information is outputted from the reader 10A to a host processor (not shown) at step S49, and this procedure is completed.

Therefore, assuming that the control unit 40 detects code information of the QR code Q only from the code image Ic1, information indicated in the first area of the QR code Q is undesirably recognized as white on the basis of the illumination levels of the remarked cells.

However, in the reader 10A according to this embodiment, the sensors 23A and 23B disposed to be shifted from the center axis Xc simultaneously pick up images containing a code image of the code Q, code images Ic1 and Ic2 of the code Q are extracted from the picked-up images, and cells in each code image are set at illumination levels corresponding to a brightness of light received in the cells. When an influence of mirror reflections caused in a first area of the QR code Q is exerted on remarked cells in the code image Ic1 of the sensor 23A, each remarked cell has a high illumination level higher than a predetermined upper value. In contrast, because the influence of the mirror reflections is not received in remarked cells of the code image Ic2 corresponding to the first area of the QR code Q, the remarked cell in the code image Ic2 has a normal illumination level lower than the predetermined upper value. The control unit 40 detects code information indicated in the first area of the QR code Q from the code image Ic2.

Accordingly, information indicated in the first area of the QR code Q can be appropriately recognized on the basis of the illumination levels of the remarked cells in the code image Ic2, and a code image having no unclear portion caused by mirror reflections can reliably be obtained by replacing the high illumination levels of the remarked cells in the code image Ic1 with the normal illumination levels of the remarked cells in the code image Ic2. That is, the reader 10A can rapidly and reliably read an information code such as a QR code without receiving adverse influence of the mirror reflections.

Further, the illuminating units 21b and 21d are arranged around the view field surrounding area of the sensors 23A and 23B in an elliptic shape such that the major axis of the elliptic shape extends along an aligning direction of the sensors 23A and 23B. Therefore, the illuminating units 21b and 21d can uniformly illuminate the information code Q along all directions to the QR code Q. Accordingly, the reader 10 can reliably read information of the information code Q directly marked on the object R at a preferable contrast regardless of a marking process such as printing or carving, a material of the object and a color of the code.

In this embodiment, when the illumination level of a cell is equal to the highest value at step S45, it is judged that an influence of a mirror reflection is received in the cell. However, this judgment may be performed when the illumination level of a cell is higher than the predetermined upper value.

Further, because the QR code Q is expressed by a matrix of 13 cells×13 cells, the image data is indicated by illumination levels distributed in a matrix of 13 cells×13 cells in the mapping process. However, when the QR code Q is expressed by a matrix of 21 cells×21 cells, the image data is indicated by illumination levels distributed in a matrix of 21 cells×21 cells in the mapping process.

Moreover, at step S41, the illuminating units 21b or the illuminating units 21d placed in all blocks may illuminate the QR code Q, or the illuminating units 21b and 21d placed in one block or in all blocks may illuminate the QR code Q.

Furthermore, the QR code is used as an information code. However, corrections on the code image can be applied for an arbitrary code such as a one-dimensional code or a two-dimensional code other than the QR code.

Fourth Embodiment

A mirror reflection mainly occurs on a portion of the information code Q when the information code Q is intensely illuminated with one bright field illuminating unit 21b disposed just above the portion of the information code Q. In this embodiment, a part of illuminating units 26b causing a mirror reflection on a portion of the information code Q are automatically lighted off to suppress a mirror reflection occurring on the information code Q.

Figure 17A:
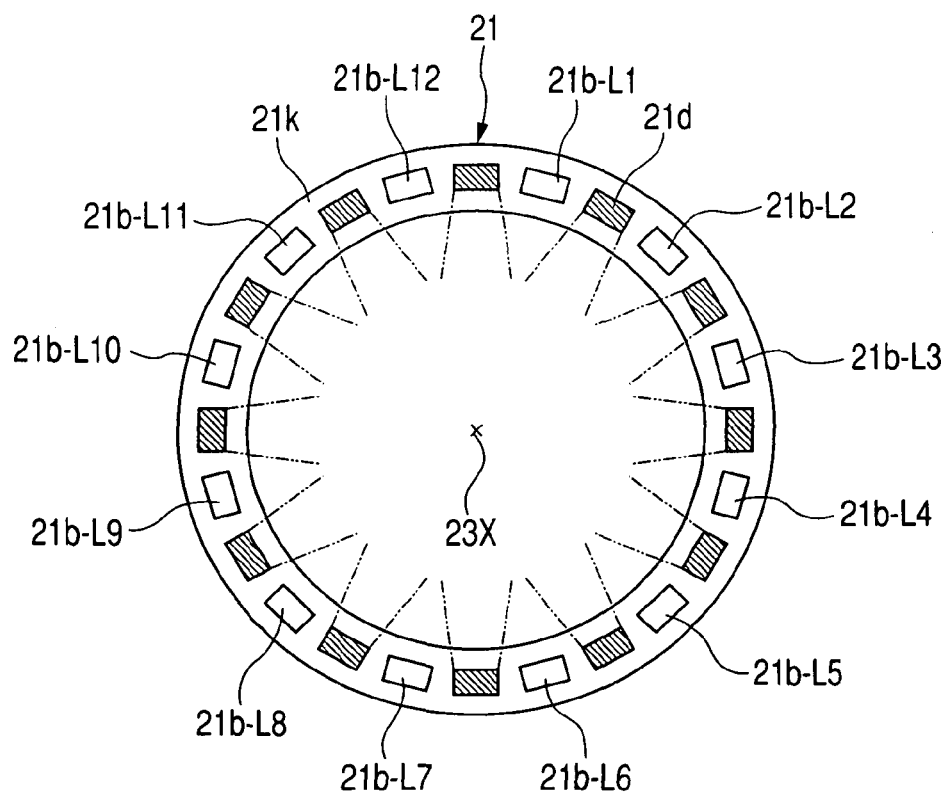
FIG. 17A is an explanatory view showing a position of each illuminating unit on the illuminator shown in FIG. 3A according to the forth embodiment.
Figure 17B:
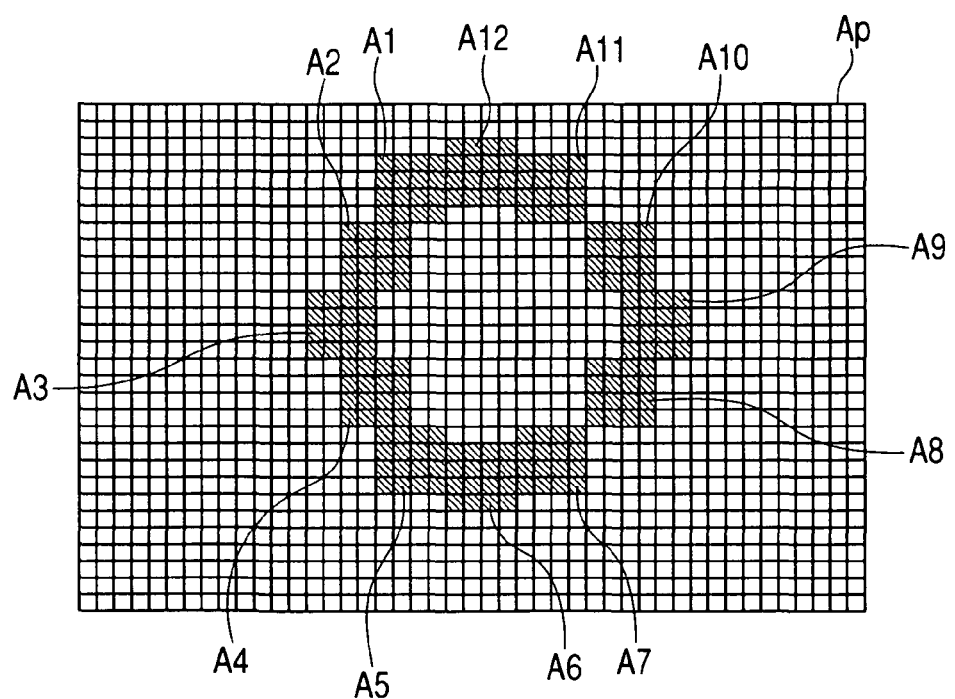
FIG. 17B is a view of a plurality of illuminated regions directly and intensely illuminated with the illuminating units shown in FIG. 17A on a photographed area.
Figures 18, 19A:
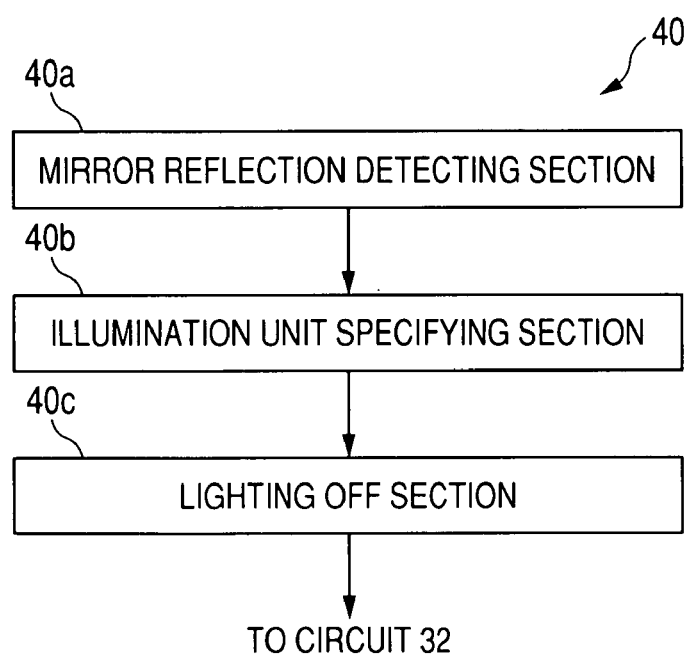
FIG. 18 shows a map indicating a relation between the illuminating units shown in FIG. 17A and the illuminated regions shown in FIG. 17B.
FIG. 19A is a block diagram of a control unit according to the fourth embodiment.

The illuminator 21 according to the fourth embodiment has the same structure as that shown in FIG. 1, FIG. 3A and FIG. 3B. FIG. 17A is an explanatory view showing a position of each illuminating unit 21b on the illuminator 21, while FIG. 17B is a view of a plurality of illuminated regions intensely illuminated with the illuminating units 21b from the upper direction on a photographed area. FIG. 18 shows a map indicating a relation between the illuminating units 21b and the illuminated regions.

As shown in FIG. 17A and FIG. 17B, the illuminating units 21b-L1, 21b-L2, 21b-L3, 21b-L4, 21b-L5, 21b-L6, 21b-L7, 21b-L8, 21b-L9, 21b-L10, 21b-L11, and 21b-L12 are clockwise placed in the illuminator 21 in that order. A photographed area Ap of the sensor 23 has a plurality of illuminated regions A1 to A12, respectively, disposed just below the illuminating units 21b. When the optical system of the reader 10 is focused on the information code Q placed on the photographed area Ap, the code Q is intensely illuminated with the illuminating unit 21b-L1 disposed just above the illuminated region A1, so that a mirror reflection occurs on a portion of the code Q placed in the illuminated region A1 at a high possibility. In the same manner, the code Q is intensely illuminated with the illuminating units 21b-L2 to 21b-L12 disposed just above the illuminated regions A12 to A12, and mirror reflections occur on portions of the code Q placed in the illuminated regions A2 to A12 at a high possibility.

As shown in FIG. 18, a map indicating the relation between the illuminating units 21b-L1 to 21b-L12 and the illuminated regions A1 to A12 is stored in the memory 35.

A reading operation of the reader 10 while suppressing mirror reflections under control of the unit 40 is described with reference to FIG. 19A and FIG. 19B. FIG. 19A is a block diagram of the control unit 40 according to the fourth embodiment, while FIG. 19B is a flow chart showing the processing for reading and decoding the information code Q in the reader 10.

The converter 33 outputs image data at an allowable data length of 10 bits for each image block of a code image. Image data of each image block is indicated by a digital illumination level, and image data receiving no influence of a mirror reflection is set at a normal illumination level ranging from 1 to 155 (equal to $2^8-1$). The normal illumination level can be expressed by a data length of 8 bits shorter than the allowable data length.

Figure 19B:
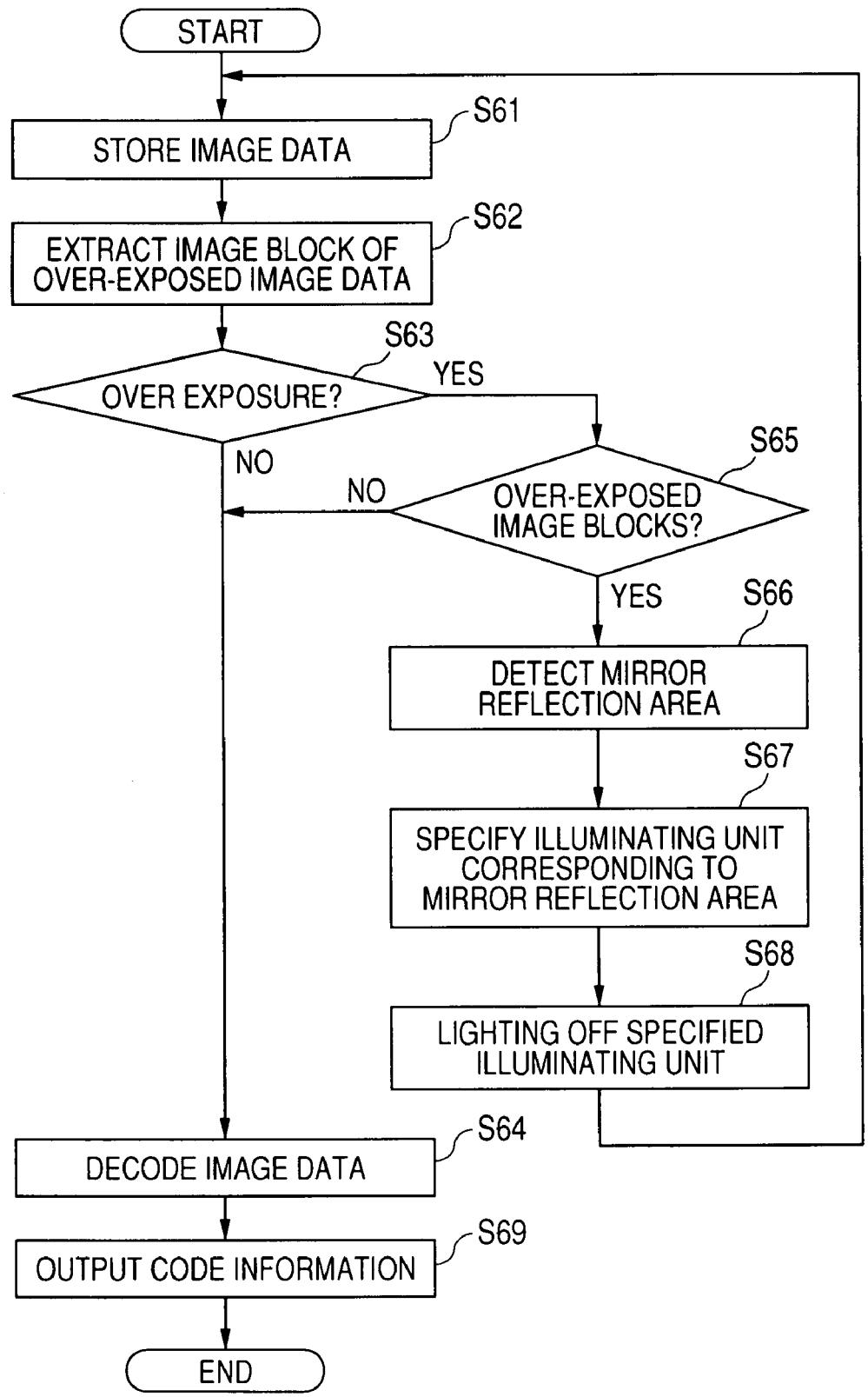
FIG. 19B is a flow chart showing the processing for reading and decoding an information code according to the fourth embodiment.

As shown in FIG. 19B, at step S61, the control unit 40 stores image data of a code image outputted from the converter 33 in the memory 35. When image data exceeds 8 bits, the control unit 40 judges that over-exposure (or exposure saturation) has occurred in an image block of the image data, and the control unit 40 stores the image data exceeding 8 bits as over-exposed image data in the memory 35. At step S62, the control unit 40 extracts an image block of the over-exposed image data as an over-exposed image block Bov for each occurrence of the over-exposure.

At step S63, the control unit 40 judges whether or not at least one over-exposed image block Bov exists in the code image. In case of a negative judgment, the procedure proceeds to step S64. In contrast, in case of an affirmative judgment, at step S65, the control unit 40 judges whether or not a plurality of over-exposed image blocks Bov successively disposed in a wide area exist in the code image. In case of an affirmative judgment, at step S66, a mirror reflection detecting section 40a of the control unit 40 shown in FIG. 19A specifies a position of the over-exposed image blocks Bov in the photographed area Ap and detects at least one of the illuminated regions A1 to A12 corresponding to the specified position as a mirror reflection area.

At step S67, an illuminator specifying unit 40b of the control unit 40 shown in FIG. 19A specifies at least one of the illuminating units 21b corresponding to the mirror reflection area with reference to the map shown in FIG. 18. The control unit 40 recognizes that illumination of the specified illuminating unit 21b causes a mirror reflection on the mirror reflection area. At step S68, a lighting off section 40c of the control unit 40 shown in FIG. 19A lights off the specified illuminating unit 21b to prevent the specified illuminating unit 21b from causing a mirror reflection on the information code Q. For example, when the illuminated regions A1, A2, A5, A8, A9, A11 and A12 are detected as a mirror reflection area, and the illuminating units 21b-L1, 21b-L2, 21b-L5, 21b-L8, 21b-L9, 21b-L11 and 21b-L12 are specified and lighted off. Then the procedure returns to step S61.

In contrast, in case of a negative judgment at step S65, the procedure proceeds to step S64. At step S64, the control unit 40 decodes the image data of the information code Q to code information. At step S69, the control unit 40 outputs the code information to a host processor (not shown), and this processing is completed.

As described above, over-exposed image data is specified from all pieces of image data of the code image, a mirror reflection area in the photographed area Ap is detected based on the over-exposed image data, and at least one of the illuminating units 21b intensely illuminating the mirror reflection area is lighted off.

Accordingly, even when an information code is directly marked on an object by a printing or carving process such that a mirror reflection is easily caused on the information code due to a material of the object or the process, the reader 10 can reliably read the information code.

Fifth Embodiment

Figure 20:
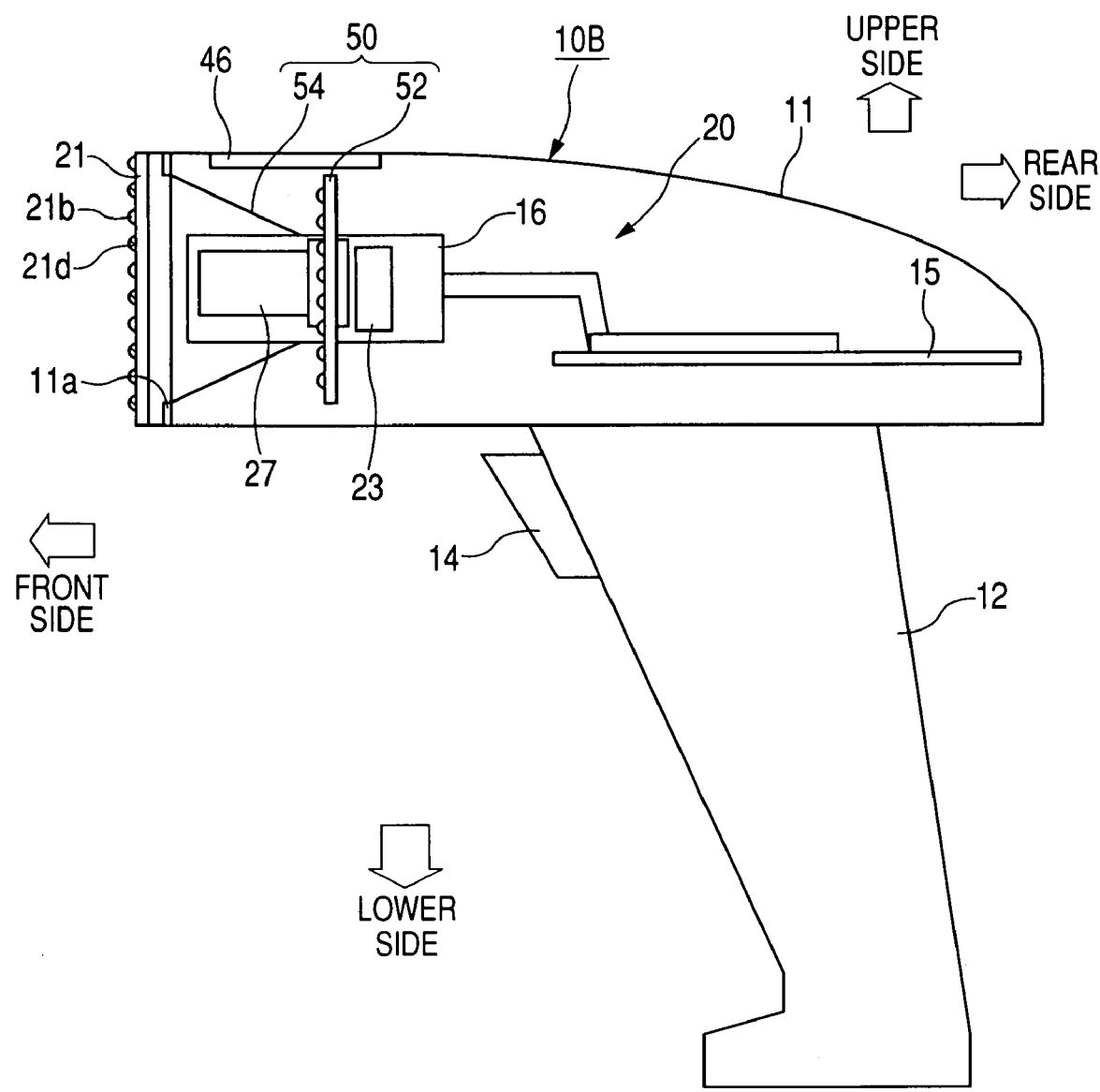
FIG. 20 is a side view, with portions broken away for clarity, of a handy type information optical reader according to the fifth embodiment.
Figure 21:
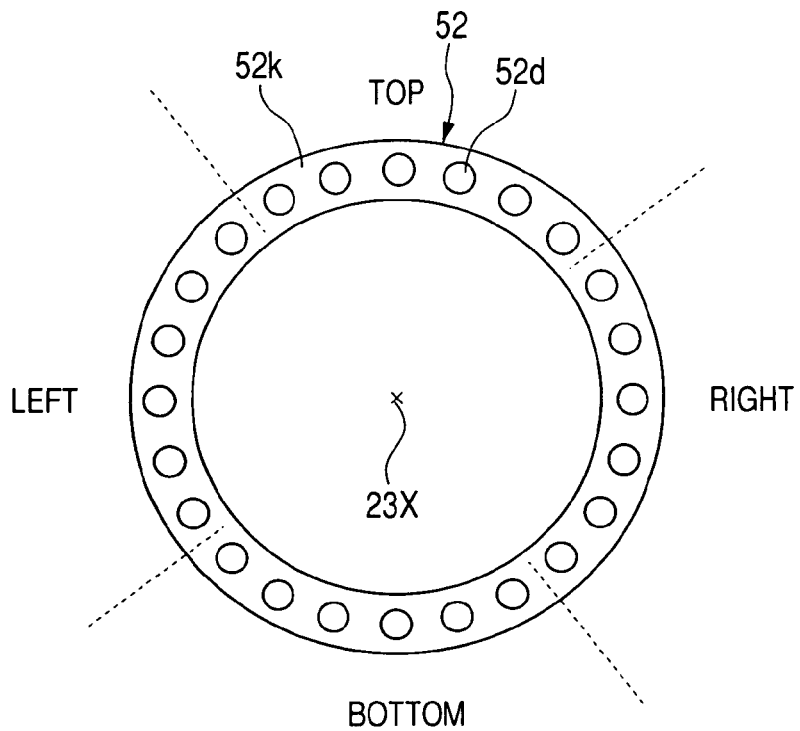
FIG. 21 is a front view of a light emitter of the reader shown in FIG. 20.
Figure 22:
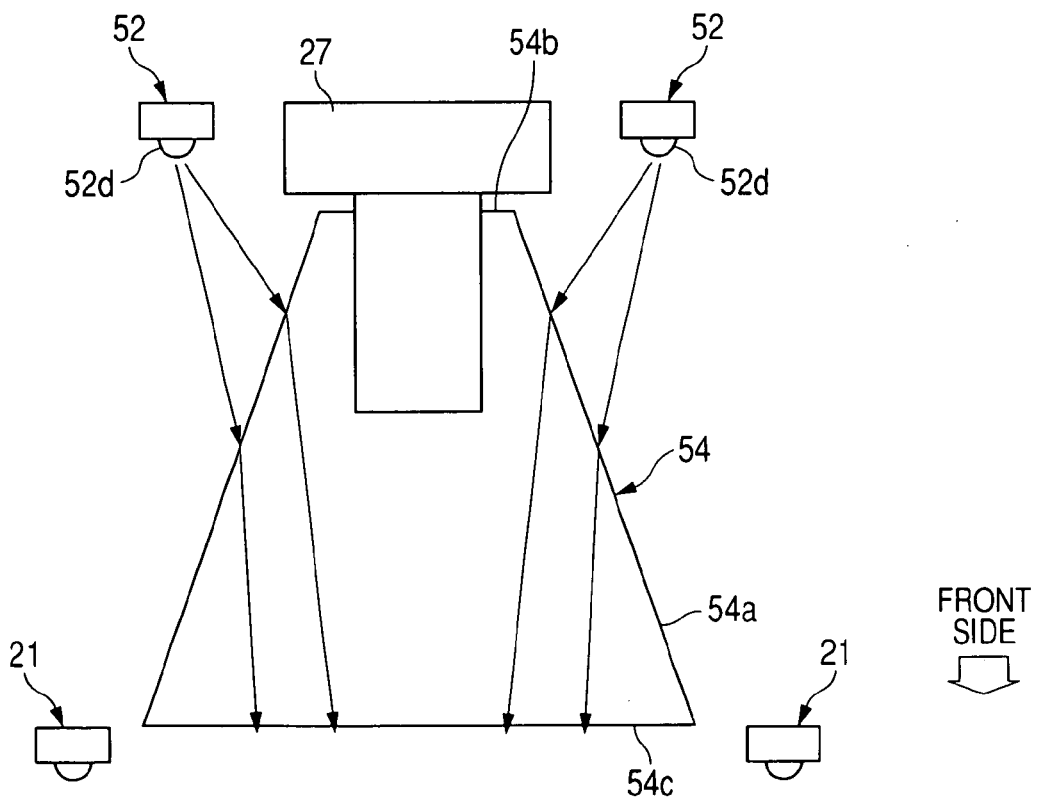
FIG. 22 is a top view of a light diffusing member of the reader shown in FIG. 20.

FIG. 20 is a side view, with portions broken away for clarity, of a handy type information optical reader according to the fifth embodiment. FIG. 21 is a front view of a light emitter of the reader seen from a front side of the reader. FIG. 22 is a top view of a light diffusing member of the reader.

As shown in FIG. 20, a handy type information optical reader 10B according to the fifth embodiment differs from the reader 10 shown in FIG. 1 in that the reader 10B additionally has a diffusion illuminator 50 attached to the board 16. The illuminator 50 has a light emitter 52 and a light diffusing member 54.

As shown in FIG. 21, the light emitter 52 has a ring-shaped substrate 52k and a plurality of light emitting units 52d disposed on the substrate 52k in a ring shape. The light emitter 52 is disposed coaxially with the illuminator 21 so as to surround the lens 27. The group of emitting units 52d is partitioned into four blocks (top, right, bottom and left blocks arranged clockwise in that order). Each block has six emitting units 52d. Under control of the circuit 32, the four blocks of emitting units 52d can be simultaneously lighted and can be lighted by turns. In the same manner as the illuminating units 21b and 21d, each emitting unit 52d has a red LED, a green LED and a blue LED. When these three LEDs are lighted under control of the circuit 32, the emitting unit 52d emits a white light. Further, under control of the circuit 32, the emitting unit 52d can emit each of the red, green and blue lights.

As shown in FIG. 22, the light diffusing member 54 is formed in a conical box shape with a flat head. The member 54 is disposed so as to surround the lens 27. The member 54 has a side wall 54a forming a head opening 54b facing the sensor 23 and a bottom opening 54c facing the opening 11a of the body 11. The member 54 is made of a transparent resin plate or the like, and fine grains are attached to the side wall 54a. Therefore, the member 54 has a granulated surface. A light of each emitting unit 52d is scattered and diffused in the side wall 54a of the member 54 as rays of a diffused light to illuminate the code Q along various directions to the code Q.

The side wall 54a of the member 54 may have concavities and/or convexities in place of the grains to change the light of the light emitter 52 to a diffused light. Further, the member 54 may be formed of a plate made of a translucent medium such as milk white resin, milk white glass or the like.

Figure 23:
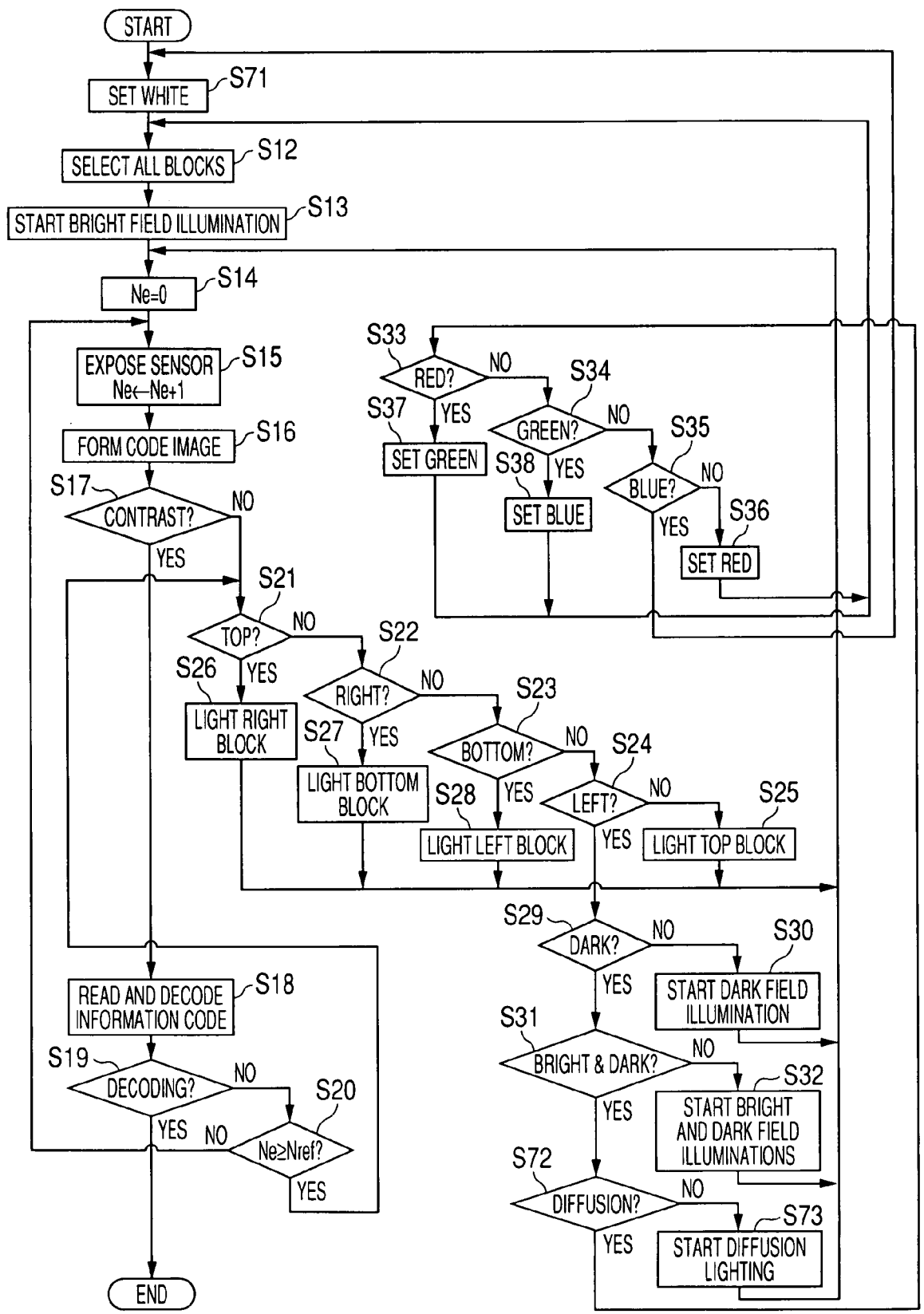
FIG. 23 is a flow chart showing the information code reading procedure according to the fifth embodiment.

With this structure of the reader 10B, an operation of the reader 10B is described with reference to FIG. 23. FIG. 23 is a flow chart showing the information code reading procedure according to the fifth embodiment.

In this embodiment, the control circuit 32 of the reader 10B controls the illuminator 21 and the light emitter 52 such that the blocks of illuminating units 21b, the blocks of illuminating units 21d and the blocks of emitting units 52d are automatically selected and lighted by turns while selecting the illumination colors one by one, and the sensor 23 forms a code image of the information code Q for each selection. Then, the reader 10B reads the information code Q when a code image with a superior contrast is obtained. The control unit 40 controls the control circuit 32 to synchronize the lighting of each block of illuminating units 21b, 21d or 52d with an image formation of the sensor 23.

As shown in FIG. 23, an operation of the reader 10B differs from an operation of the reader 10 shown in FIG. 9 in that the blocks of emitting units 52d are additionally selected and lighted by turns. More specifically, at step S71 executed in place of step S11, the illumination color is initially set at a white light in all illuminating units 21b and 21d and all emitting units 52d. In case of an affirmative judgment at step S31, it is judged at step S72 whether or not the information code is illuminated in the diffusion lighting or illumination. That is, it is judged at step S72 whether or not the emitting units 52d are lighted. In case of a negative judgment at step S72, it is recognized that the bright and dark field illuminations simultaneously performed at the selected illumination color has been finished without successfully obtaining code information. Therefore, at step S73, to start the diffusion lighting or illumination, all blocks of emitting units 52d are lighted, and the left block of illuminating units 21b and 21d lighted at step S28 are lighted off. Then, the procedure returns to step S14.

Therefore, when no code image with a superior contrast is obtained in the bright field illumination and the dark field illumination alternately performed and simultaneously performed, all the illuminating units 21b and 21d are lighted off, and the blocks of emitting units 52d are lighted by turns and then are lighted simultaneously. When each block of emitting units 52d is lighted, lights emitted from the emitting units 52d are diffused on the side surface of the member 54 and are reflected on an information code. The reflected lights are incident on the sensor 23 through the bottom opening 54c of the member 54 and the lens 27, so that a code image is formed in the sensor 23. When a code image with a superior contrast is formed at step S16 and is successfully decoded at steps S18 and S19, the procedure is completed. In contrast, when no code information is obtained at steps S18 and S19, an affirmative judgment is made at step S72. That is, it is recognized that the diffused lighting at a specific color is not successfully completed. Then, the procedure proceeds to steps S33 to S38 to illuminate the information code Q with each of red, green and blue lights emitted from each block of emitting units 52d.

Figure 24A:
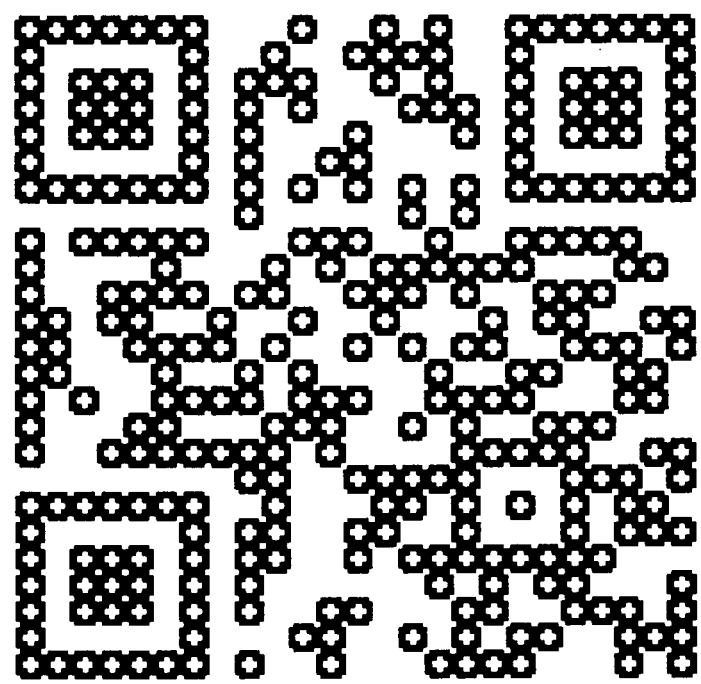
FIG. 24A shows a code image of an information code obtained in the dark field illumination.
Figure 24B:
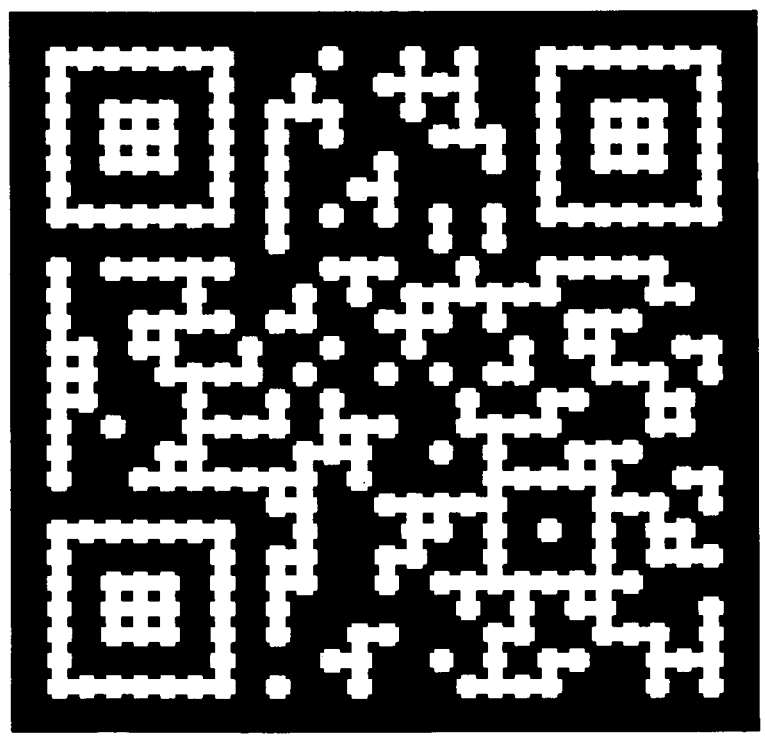
FIG. 24B shows a code image of an information code obtained in the diffused lighting or illumination according to the fifth embodiment.

FIG. 24A shows a code image of an information code obtained in the dark field illumination using only the illuminating units 21d, while FIG. 24B shows a code image of the information code obtained in the diffused lighting or illumination using only the emitting units 52d. Dots of an information code (or mark) are directly printed or carved on an object, so that each dot of the information code has a side wall rising from the surface of the object or falling to a hole of each dot.

When the information code is illuminated with one block of illuminating units 21d along an illumination direction significantly slanting from a direction perpendicular to a surface of the object, no light reflected on the side walls of the information code reaches the sensor 23. Therefore, as shown in FIG. 24A, a code image of the information code has a shadowed portion surrounding each dot of the information code, and a center portion of each dot becomes bright in the code image. Because the code image is indicated by a bright portion and a shadow portion surrounding the bright portion for each dot of the information code, it is difficult for a user to immediately recognize the code image.

In contrast, when one block of emitting units 52d is lighted, the code is illuminated with the diffused lights of the emitting units 52d along various directions to the code. A part of the diffused lights are reflected on the side walls of the information code and reach the sensor 23. Further, another part of the diffused lights are reflected on a center portion of each dot of the information code and reach the sensor 23. In contrast, the other part of the diffused lights are incident on the surface of the object out of the dots of the information code at small incident angles to the surface of the object, so that no lights reflected on the surface of the object substantially reach the sensor 23. Therefore, as shown in FIG. 24B, a code image of the information code has bright portions indicating the dots of the information code and dark portions surrounding the dots. Therefore, when a code image is formed from the code information on the basis of the diffused lights of the emitting units 52d, the reader 10B can easily read the code information.

In this embodiment, when no code image with a superior contrast is found out from a plurality of code images obtained by lighting the blocks of illuminating units 21b and the blocks of illuminating units 21d by turns, the blocks of emitting units 52d are automatically lighted by turns. The information code Q printed or carved on the object R is illuminated with the diffused lights of the emitting units 52d in the diffused lighting or illumination which differs from the direct illumination and the indirect illumination based on the illuminating units 21b and 21d. Because the diffused lights of each block of emitting units 52d illuminate the information code Q along various directions, a part of the diffused lights are necessarily reflected on the side wall of each dot of the information code Q and reach the sensor 23, and another part of the diffused lights are necessarily reflected on a center portion of each dot of the information code and reach the sensor 23. Therefore, even though no code image with a superior contrast is found out in the direct illumination and the indirect illumination, the diffused lights of the emitting units 52d can reliably form a code image with a superior contrast without forming dark and bright portions in each dot image of the code image.

Accordingly, because the blocks of illuminating units 21b, the blocks of illuminating units 21d and the blocks of emitting units 52d are lighted by turns to form a code image with a superior contrast, the reader 10B can reliably read an information code directly marked on an object regardless of a marking process such as printing or carving or a material of the object.

Particularly, when the information code is away from the reader 10B by a closed distance, a code image based on diffused lights of the emitting units 52d can have a superior contrast. When the information code is away from the reader 10B by a comparatively long distance, a code image based on the bright field illumination or dark field illumination of the illuminating units 21b or 21d can have a superior contrast. Accordingly, the reader 10B can reliably read an information code of an object regardless of a distance between the reader 10B and the information code.

Further, because the member 54 has a granulated translucent surface so as to scatter a light of each emitting unit 52d incident on the member 54 as a diffused light, the diffused light can be easily and reliably formed.

Modification of Fifth Embodiment

Figure 25:
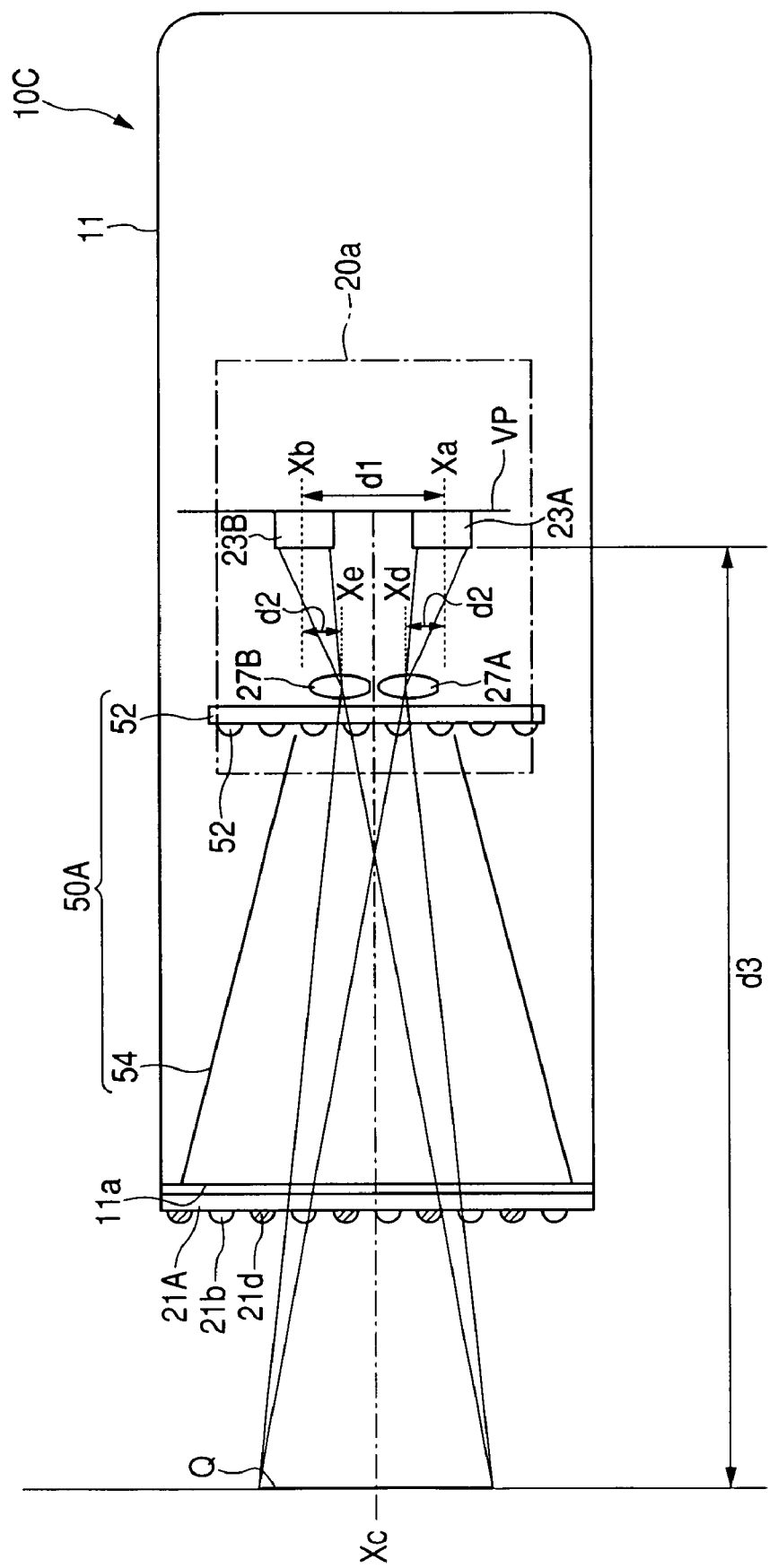
FIG. 25 is an explanatory view schematically showing the formation of two code images in an optical system of an information optical reader according to a modification of the fifth embodiment.
Figure 26:
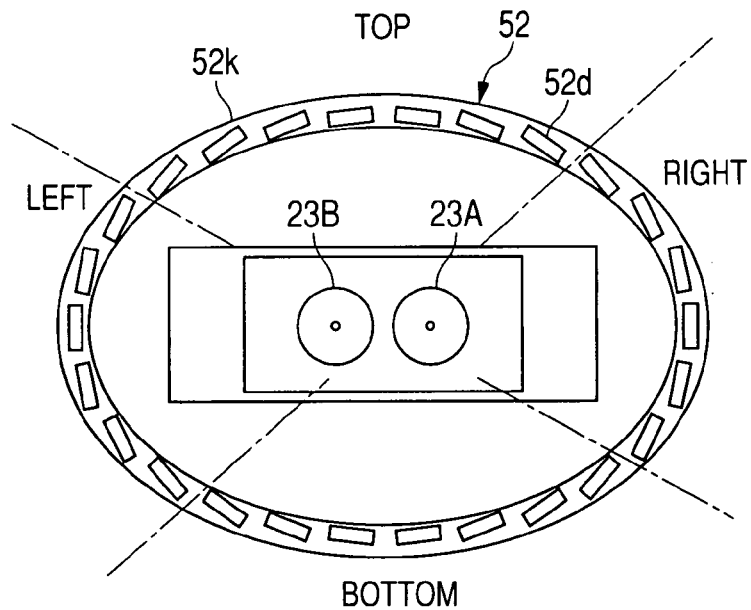
FIG. 26 is a front view of a light emitter and two sensors of the reader shown in FIG. 25.
Figure 27:
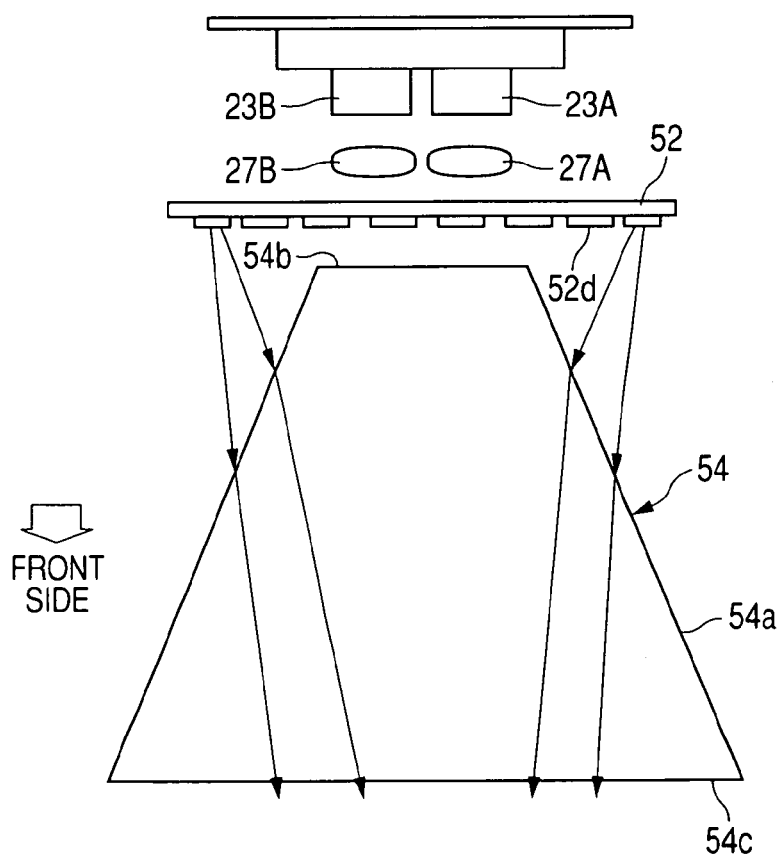
FIG. 27 is a top view of an optical system, a light emitter and a diffusing member of the reader shown in FIG. 25.

The inventions according to the third and fifth embodiments may be combined. FIG. 25 is an explanatory view schematically showing the formation of two code images in an optical system of an information optical reader according to a modification of the fifth embodiment. FIG. 26 is a front view of a light emitter and two sensors of the reader. FIG. 27 is a top view of the optical system, the light emitter and the diffusing member 54.

As shown in FIG. 25, an information optical reader 10C according to this modification differs from the reader 10B shown in FIG. 20 in that the reader 10C has the illuminator 21A, an optical system composed of the lenses 27A and 27B and the sensors 23A and 23B, and a diffusion illuminator 50A attached to the board 16. The diffusion illuminator 50A has a diffusion light emitter 52A and the light diffusing member 54. The light emitter 52A is disposed coaxially with the illuminator 21A.

As shown in FIG. 26, the light emitter 52A has an elliptically-shape substrate 52k and the diffusion emitting units 52d disposed on the substrate 52k in an elliptic shape. A major axis of the light emitter 52A extends along an aligning direction of the lenses 23A and 23B. The group of emitting units 52d is partitioned into four blocks (top, right, bottom and left blocks arranged clockwise in that order). The four blocks of emitting units 52d can be simultaneously lighted and can be lighted by turns.

As shown in FIG. 27, the top opening 54b of the member 54 faces the lenses 27A and 27B through the center opening of the light emitter 52A. The bottom opening 54c of the member 54 faces the opening 11a disposed at the top end of the reader 10C.

With this structure of the reader 10C, a code image Ic1 and a code image Ic2 are, respectively, formed in the sensors 23A and 23B on the basis of the diffused lights emitted from each block of emitting units 52d. The code image Ic1 has an unclear portion corresponding to a first area of the code due to mirror reflections on the first area, but the code image Ic2 has a clear portion corresponding to the first area of the code. The code image Ic1 is corrected in the same manner as in the third embodiment by replacing the unclear portion with the clear portion of the code image Ic2, and a corrected code image having no unclear portion is obtained.

Accordingly, in addition to the effects in the fifth embodiment, even though mirror reflections occur on the code by lights emitted from the light emitter 52A, an adverse influence of the mirror reflections can be suppressed, and the reader 10C can rapidly and reliably read the information code.

Sixth Embodiment

Figure 28:
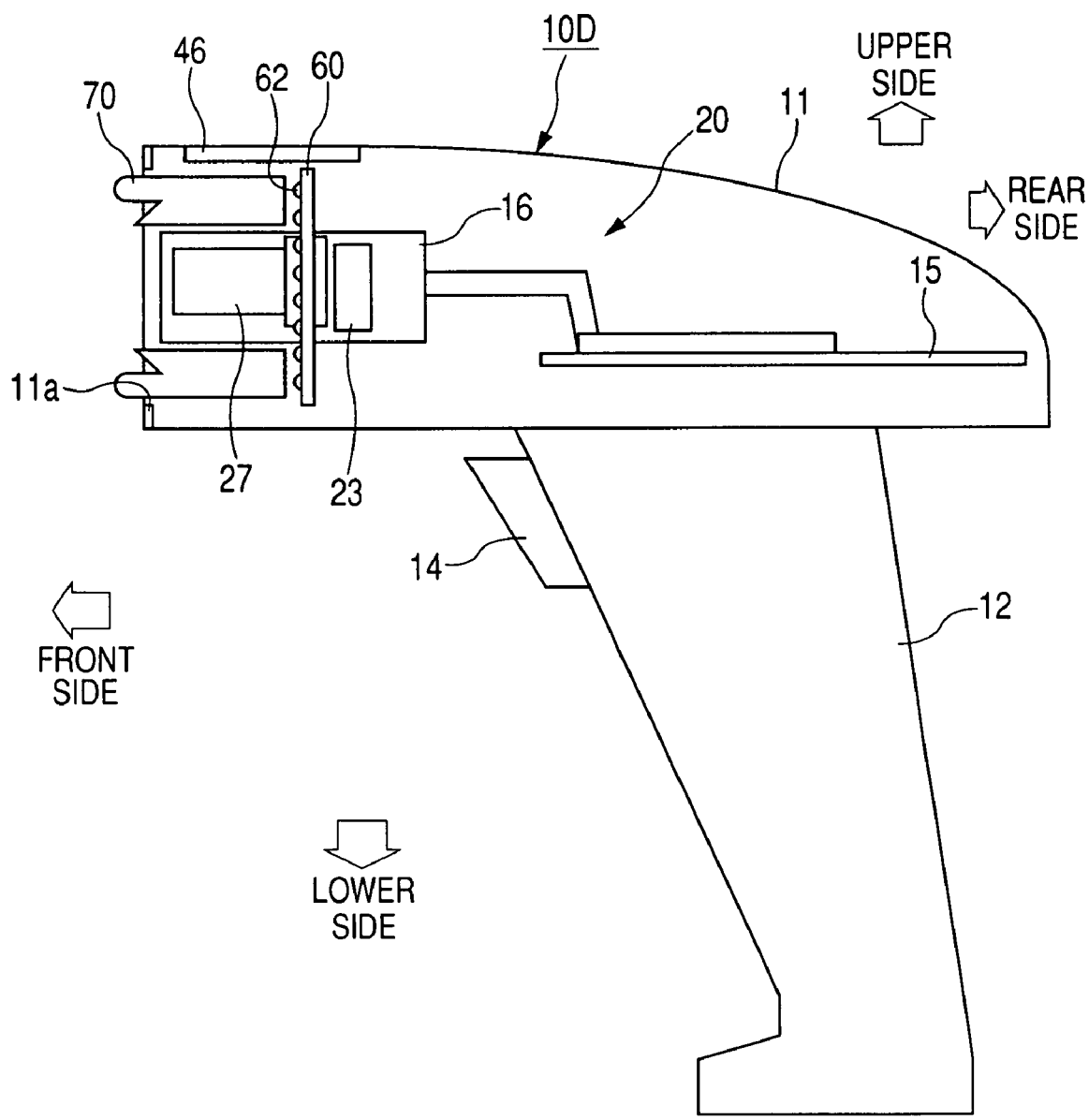
FIG. 28 is a side view, with portions broken away for clarity, of a handy type information optical reader according to the sixth embodiment.
Figure 29:
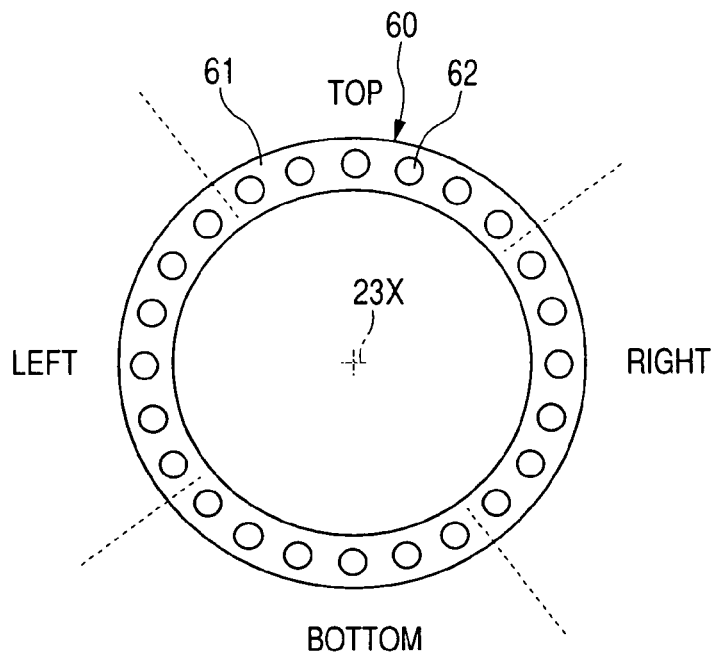
FIG. 29 is a front view of a light emitter of the reader shown in FIG. 28.
Figure 30:
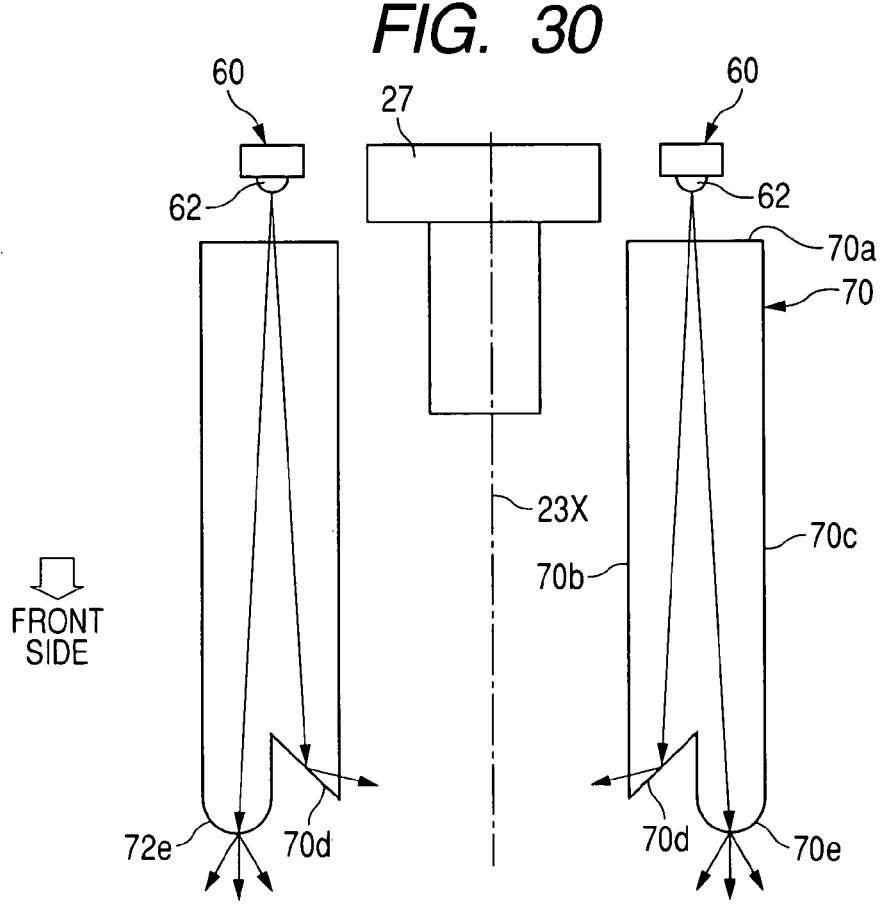
FIG. 30 is a top view of the light emitter and a light leading member of the reader shown in FIG. 28.

FIG. 28 is a side view, with portions broken away for clarity, of a handy type information optical reader according to the sixth embodiment. FIG. 29 is a front view of a light emitter of the reader seen from a front side of the reader. FIG. 30 is a top view of the light emitter and a light leading member of the reader.

As shown in FIG. 28, an information optical reader 10D according to the sixth embodiment differs from the reader 10 shown in FIG. 1 in that the reader 10D has a light emitter 60 and a light leading member 70 in place of the illuminator 21. The light emitter 60 is attached to the board 16 on the inside of the reader 10D. The member 70 is made of a transparent material such as resin, glass or the like and leads light emitted from the light emitter 60 to the outside of the opening 11a to laminate an information code of an object.

As shown in FIG. 29, the light emitter 60 is formed in a ring shape. The light emitter 60 has a substrate 61 formed in a ring shape and a plurality of light emitting units 62 disposed on the substrate 61 in a ring shape so as to surround a rear portion of the lens 27. The group of emitting units 62 is partitioned into four blocks (top, right, bottom and left blocks arranged clockwise in that order). There are six emitting units 62 in each block. Under control of the circuit 32, the four blocks of emitting units 62 can be simultaneously lighted and can be lighted by turns. In the same manner as the illuminating units 21b and 21d, each emitting unit 62 has a red LED, a green LED and a blue LED. When these three LEDs are lighted, the emitting unit 62 emits a white light. Further, under control of the circuit 32, the emitting unit 62 can emit each of the red, green and blue lights. Each block of emitting units 62 may manually emit light or may automatically emit light.

As shown in FIG. 30, the light leading member 70 is formed in a double-cylindrical shape. The member 70 has a rear flat wall 70a facing the light emitter 60, an inner circumferential wall 70b facing the lens 27, an outer circumferential wall 70c, a reflecting flat wall 70d placed on the front end of the member 70, and a light refracting wall 70e placed on the front end of the member 70. The walls 70b and 70c substantially extend along the optical axis 23X. Lights emitted from the light emitter 60 are incident on the wall 70a of the member 70 almost at right angles and pass through the wall 70a without reflection. Then, the lights are transmitted through a space between the walls 70b and 70c and are incident on the walls 70e and 70e.

The wall 70d of the member 70 is placed on the inner side of the member 70 and is inclined at almost 45 degrees to the optical axis 23X. First lights transmitted through the member 70 are reflected on the wall 70d so as to change a transmission direction of the lights such that the reflected lights are transmitted toward the optical axis 23X at a predetermined divergent angle while being slightly shifted toward the front side (i.e., toward the information code). Therefore, lights reflected on the wall 70d illuminate the information code in the dark field illumination at an oblique angle to the information code, so that the wall 70d acts as a dark field illuminator. Because the emitting units 62 are disposed in a ring shape so as to surround the optical axis 23X, the illumination directions of the lights to the information code differ from one another.

The wall 70e of the member 70 is placed on the outer side of the member 70 and is formed in a semi-spherical shape. Second lights transmitted through the member 70 are refracted on the wall 70e to change a transmission direction of the lights such that the refracted lights are transmitted along the optical axis 23X at a predetermined divergent angle while being slightly shifted toward the optical axis 23X. Therefore, light refracted on the wall 70e illuminates the information code at a perpendicular luminous angle to the information code in the bright field illumination, so that the wall 70e acts as a bright field illuminator. Because the emitting units 62 are disposed in a ring shape so as to surround the optical axis 23X, the illumination directions of the lights to the information code differ from one another.

With this structure of the reader 10D, the member 70 leads light emitted from each block of emitting units 62 to the front end of the reader 10D. Then, the member 70 reflects a part of the light on the wall 70d toward the optical axis 23X while slightly shifting the lights toward the information code. Therefore, the information code is illuminated with the reflected light in the dark field illumination. Further, the member 70 refracts the remaining part of the light in the wall 70e to transmit the refracted light along the optical axis 23X while slightly shifting the light toward the optical axis 23X. Therefore, the information code is illuminated with the reflected light in the bright field illumination.

Accordingly, because the reader 10D has the light emitter 60 and the member 70 acting as the bright and dark field illuminators, the reader 10D can reliably read an information code directly marked on an object regardless of a marking process such as printing or carving, a material of the object and a color of the code.

Further, because the light emitter 60 is disposed on the inside of the reader 10D, feeding lines connected with the light emitter 60 can be disposed on the inside of the reader 10D. Accordingly, the reader 10D can have a good looking outward appearance.

Moreover, because the reflecting wall 70d of the member 70 is placed so as to be inclined by almost 45 degrees with respect to the optical axis 23X, light reflected on the wall 70d can be transmitted toward the optical axis 23X at a predetermined divergent angle while being slightly shifted toward the information code. Accordingly, light reflected on the wall 70d can illuminate the information code in the dark field illumination or the oblique incident illumination. That is, the wall 70d disposed on the front end of the member 70 can act as a dark field illuminator.

Furthermore, because the light transmitting wall 70e of the member 70 is formed in a semi-spherical shape on the front end of the member 70, light refracted in the wall 70e can be transmitted along the optical axis 23X at a predetermined divergent angle while being slightly shifted toward the optical axis 23X. Accordingly, light refracted in the wall 70e can illuminate the information code in the bright field illumination or the coaxially-fallen illumination, so that the wall 70e can act as a bright field illuminator.

Modifications of Sixth Embodiment

Figure 31:
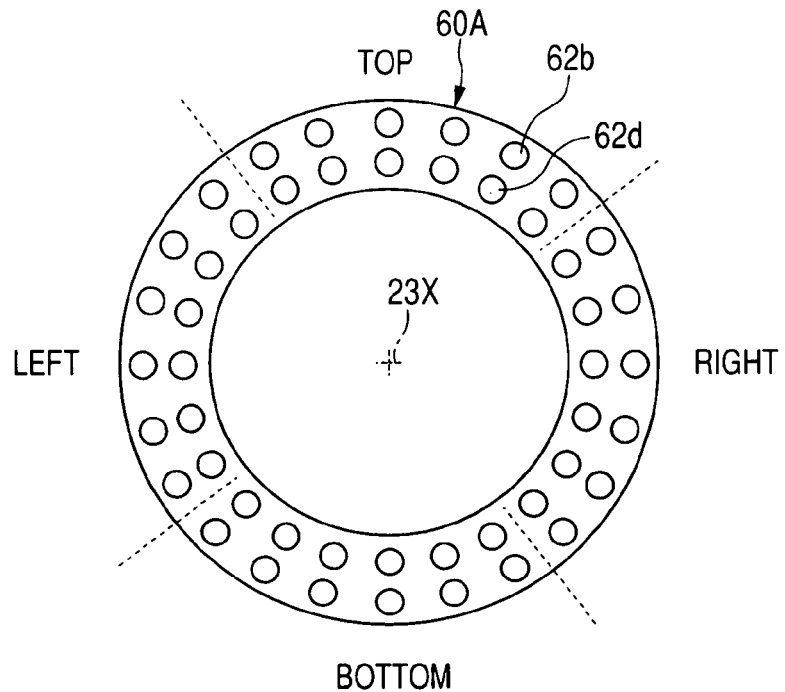
FIG. 31 is a front view of a light emitter of the reader according to a first modification of the sixth embodiment.
Figure 32:
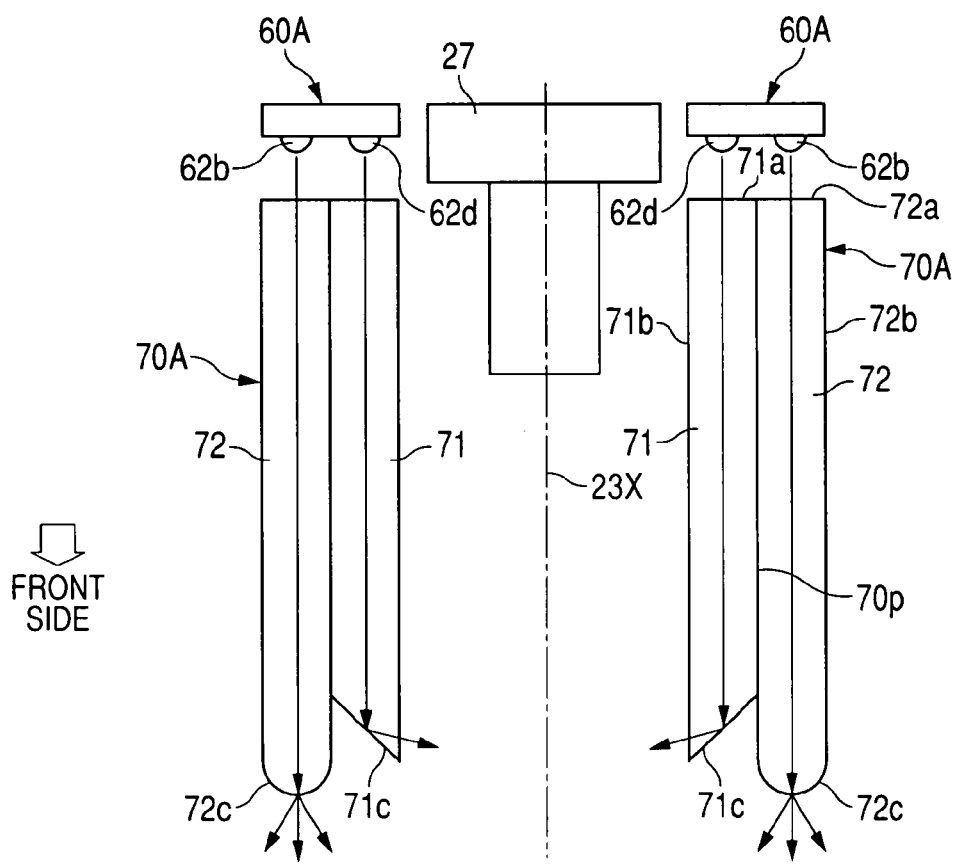
FIG. 32 is a top view of the light emitter and a light leading member of the reader according to the first modification of the sixth embodiment.

FIG. 31 is a front view of a light emitter of the reader seen from a front side of the reader according to a first modification of the sixth embodiment. FIG. 32 is a top view of the light emitter and a light leading member of the reader.

As shown in FIG. 31, the reader 10D according to this modification has a modified light emitter 60A in place of the light emitter 60 shown in FIG. 29, and the light emitter 60A differs from the light emitter 60 in that the light emitter 60A has a substrate 61A, a plurality of first light emitting units 62d arranged in a ring shape on the substrate 61A, and a plurality of second light emitting units 62b arranged in a ring shape on the substrate 61A. The emitting units 62b are disposed so as to surround the emitting units 62d. The group of emitting units 62b and 62d is partitioned into four blocks (top, right, bottom and left blocks arranged clockwise in that order). There are six emitting units 62b and six emitting units 62d in each block.

Under control of the circuit 32, the four blocks of emitting units 62b can be lighted by turns and can be simultaneously lighted, and the four blocks of emitting units 62d can be lighted by turns and can be simultaneously lighted. Further, the four blocks of emitting units 62b and 62d can be simultaneously lighted and can be lighted by turns. In the same manner as the illuminating units 21b and 21d, each of the emitting units 62b and 62d has a red LED, a green LED and a blue LED. When these three LEDs are simultaneously lighted, the emitting unit emits a white light. Further, each of the emitting units 62b and 62d can emit the red, green and blue lights one by one. Each block of emitting units may manually emit light or may automatically emit light.

As shown in FIG. 32, the reader 10D according to this modification has a modified light leading unit 70A in place of the member 70, and the unit 70A differs from the member 70 shown in FIG. 30 in that the unit 70A has a first light leading member 71 formed in a smaller double-cylindrical shape and a second light leading member 72 formed in a larger double-cylindrical shape so as to surround the member 71 from the outer circumferential side of the member 71.

The member 71 is made of a first transparent material having a first refractive index, and the member 72 is made of a second transparent material having a second refractive index higher than the first refractive index of the member 71. The member 71 has a rear flat wall 71a facing the emitting units 62d, an inner circumferential wall 71b facing the lens 27, and a reflecting flat wall 71c placed on the front end. The member 72 has a rear flat wall 72a facing the emitting units 62b, an outer circumferential wall 72b, and a light transmitting wall 72c placed on the front end. The leading unit 70A is partitioned into the members 71 and 72 by a partitioning wall 70p. Light emitted from the emitting units 62d is incident on the wall 71a of the member 71 almost at right angles and passes through the wall 71a. Then, the light is transmitted through a space between the walls 70p and 71b.

The wall 71c is inclined almost at 45 degrees to the optical axis 23X. Light transmitted through the member 71 is reflected on the wall 71c and is transmitted toward the optical axis 23X at a predetermined divergent angle while being slightly shifted toward the front side (i.e., toward the information code). Therefore, light reflected on the wall 71*c* illuminates the information code in the dark field illumination, so that the wall 71*c* acts as a dark field illuminator. The wall 72*c* of the member 72 is formed in a semi-spherical shape. Light transmitted through the member 72 is refracted in the wall 72*c* and is transmitted along the optical axis 23X at a predetermined divergent angle while being slightly shifted toward the optical axis 23X. Therefore, light refracted in the wall 72*c* illuminates the information code in the bright field illumination, so that the wall 72*c* acts as a bright field illuminator.

Accordingly, because the reader 10D has the wall 71*c* acting as the dark field illuminator and the wall 72*c* acting as the bright field illuminator, the reader 10D can reliably read an information code directly marked on an object regardless of a marking process printing or carving, a material of the object and a color of the code.

Further, because the reader 10D can select and light the blocks of emitting units 62*d* and the blocks of emitting units 62*b* by turns, the reader 10D can select the dark and bright field illuminators by turns or simultaneously. Accordingly, the reader 10D can optically read the information code in the illumination appropriate to the information code printed or carved on the object.

Moreover, because the refractive index of the member 71 is smaller than that of the member 72, an amount of light leaking from the open space of the member 71 to the open space of the member 72 can be lowered. Accordingly, the reader 10D can reliably read the information code illuminated at high brightness in the dark field illumination.

Figure 33:
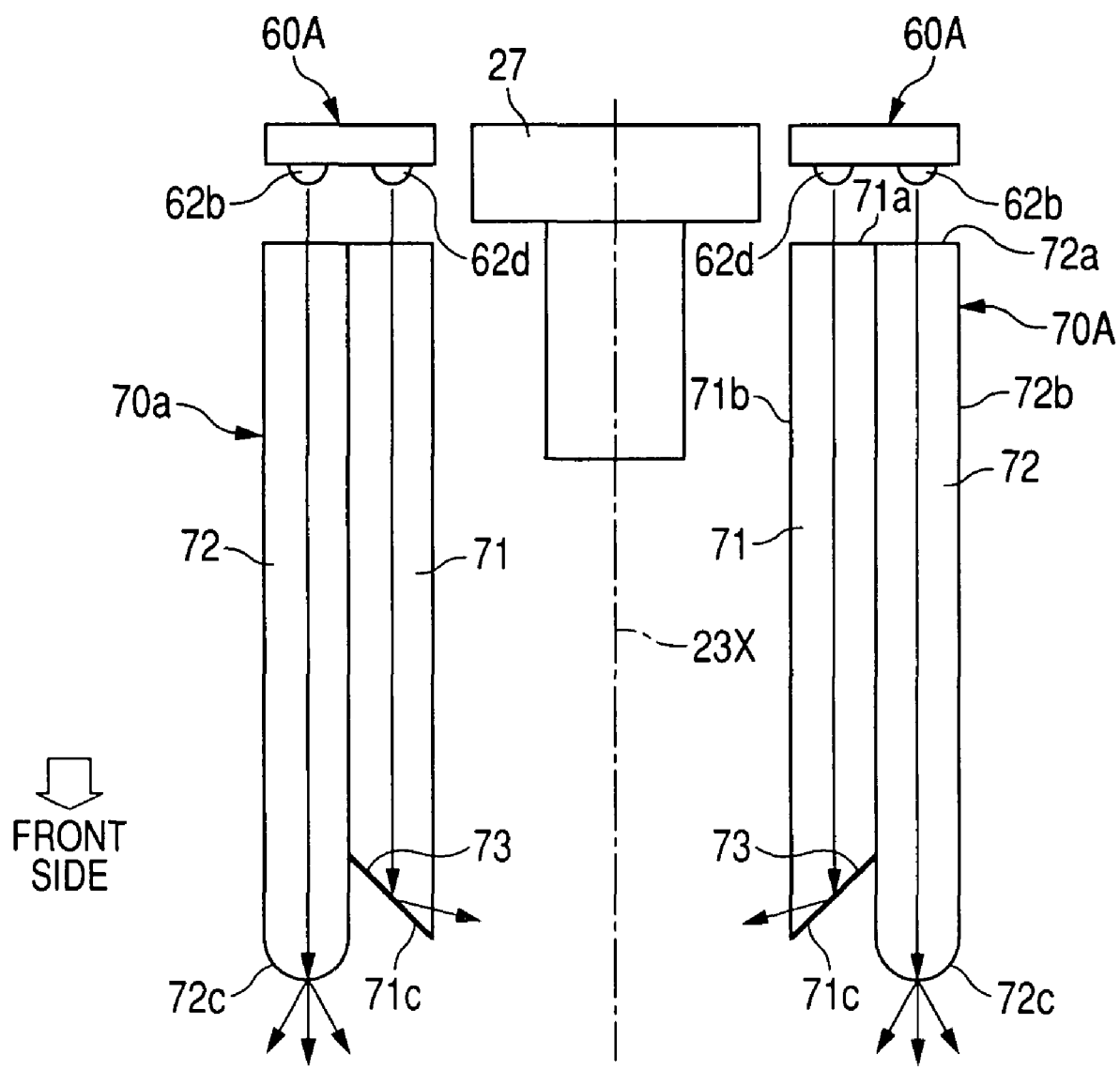
FIG. 33 is a top view of the light emitter and a light leading member of the reader according to the second modification of the sixth embodiment.

FIG. 33 is a top view of the light emitter 60A and a light leading member of the reader according to the second modification of the sixth embodiment.

As shown in FIG. 33, the reader 10D according to this modification has a modified light leading unit 70B in place of the unit 70A shown in FIG. 32, and the unit 70B differs from the unit 70A in that the member 71 of the unit 70B additionally has a reflecting coating layer 73 on the wall 71*c*. The coating layer 73 is made of aluminum or the like. The coating layer 73 acts as a total reflection mirror.

Accordingly, because the coating layer 73 totally reflects the light transmitting through an open space of the member 71, the reader 10D can reliably read the information code illuminated at higher brightness in the dark field illumination.

These embodiments should not be construed as limiting the present invention to structures of those embodiments, and the structure of this invention may be combined with that based on the prior art. For example, the information code Q is represented by the QR code. However, the present invention can apply for an information optical reader reading a one-dimensional code or a two-dimensional code other than the QR code. Further, the present invention can apply for a stationary information optical reader. Moreover, the present invention is not limited to an illuminator partitioned into four blocks but can be applied for an illuminator partitioned into three blocks or more. Furthermore, only a single lighting unit may be disposed in each block.

What is claimed is:

1. An information reader for optically reading an information code directly marked on an object, comprising:
    a bright field illuminator that can be lighted to illuminate the information code with a first light at a first luminous angle to the information code and to regularly reflect the first light on the information code;
    a dark field illuminator that can be lighted to illuminate the information code with a second light at a second luminous angle to the information code and to irregularly reflect the second light on the information code, the second luminous angle differing from the first luminous angle;
    an optical system that forms an image of the information code from the first light or the second light reflected on the information code; and
    a control section that controls the bright field illuminator and the dark field illuminator such that the optical system forms an image of the information code from the first and second lights reflected on the information code, and reads the information code from the image,
    wherein the bright field illuminator comprises:
        a plurality of bright field illuminating units each of which emits a bright field light, and
    the control section comprises:
        a minor reflection detecting section that detects a portion of the information code on which a mirror reflection is caused by one of the bright field lights;
        an illuminating unit specifying section that specifies one of the bright field illuminating units which emits the bright field light to the portion of the information code detected by the mirror reflection detecting section; and
        a lighting off section that lights off the bright field illuminating unit specified by the illuminating unit specifying section such that the optical system forms the image from the bright field lights of the bright field illuminating units other than the bright field illuminating unit lighted off.

2. The reader according to claim 1, wherein
    the optical system comprises:
        an image forming lens; and
        an image pickup sensor forming the image from the light which is reflected on the information code and passes through the image forming lens,
    the dark field illuminator comprises:
        a plurality of dark field illuminating units each of which emits a dark field light, and
    each of the group of bright field illuminating units and the group of dark field illuminating units is disposed so as to surround a view field of the image pickup sensor.

3. The reader according to claim 2, wherein each of the group of bright field illuminating units and the group of dark field illuminating units are arranged in a ring shape.

4. The reader according to claim 2, wherein
    the group of bright field illuminating units is partitioned into three blocks or more,
    the group of dark field illuminating units is partitioned into three blocks or more,
    a group of bright field lights emitted from each block of bright field illuminating units has an illumination direction differing from those of the other groups of bright field lights emitted from the other blocks of bright field illuminating units,
    a group of dark field lights emitted from each block of dark field illuminating units has an illumination direction differing from those of the other groups of dark field lights emitted from the other blocks of dark field illuminating units, and
    the control section is adapted to light the blocks of bright field illuminating units by turns and to light the blocks of dark field illuminating units by turns.

5. The reader according to claim 1, wherein
    the optical system comprises:
        a plurality of image forming lenses aligned along a first direction; and a plurality of image pickup sensors corresponding to the image forming lenses such that each of the image pickup sensors forms an image from the light reflected on the information code and passing through the corresponding image forming lens, the dark field illuminator comprises:
  a plurality of dark field illuminating units each of which emits a dark field light, each of the group of bright field illuminating units and the group of dark field illuminating units are disposed in an elliptic shape having a major axis along the first direction so as to surround a view field of the image pickup sensors, and the control section lights one of the bright and dark field illuminators such that each image pickup sensor of the optical system forms an image of the information code from the bright or dark field lights reflected on the information code and reads the information code from a combination of the images formed by the image pickup sensor.

6. The reader according to claim 5, wherein each of the group of bright field illuminating units and the group of dark field illuminating units is partitioned into three blocks or more, a group of bright field lights emitted from each block of bright field illuminating units has an illumination direction differing from those of the other groups of bright field lights emitted from the other blocks of bright field illuminating units, a group of dark field lights emitted from each block of dark field illuminating units has an illumination direction differing from those of the other groups of dark field lights emitted from the other blocks of dark field illuminating units, and the control section is adapted to light the blocks of bright field illuminating units by turns and to light the blocks of dark field illuminating units by turns.

7. The reader according to claim 1, wherein the bright and dark field illuminators are disposed on a substrate.

8. The reader according to claim 1, wherein the dark field illuminator comprises:
  a plurality of dark field illuminating units each of which emits a dark field light, and the bright and dark field illuminating units are alternately disposed on a substrate.

9. The reader according to claim 1, wherein the bright field illuminator is disposed on a first surface of a substrate so as to face the information code, and the dark field illuminator is disposed on a second surface of the substrate opposite to the first surface.

10. The reader according to claim 1, wherein the dark field illuminator comprises:
  a plurality of dark field illuminating units each of which emits a dark field light, the bright field illuminating units and a part of the dark field illuminating units are alternately disposed on a first surface of a substrate so as to face the information code, and the remaining part of the dark field illuminating units are disposed on a second surface of the substrate opposite to the first surface.

11. The reader according to claim 1, wherein the dark field illuminator comprises:
  a plurality of dark field illuminating units each of which emits a dark field light, each of the bright and dark field illuminating units has a first light emitting device emitting a red light, a second light emitting device emitting a green light, and a third light emitting device emitting a blue light.

12. The reader according to claim 1, further comprising a display that displays the image of the information code each time the control section lights the bright field illuminator or the dark field illuminator.

13. The reader according to claim 1, wherein the control section comprises:

a contrast judging unit that judges, each time the control section lights the bright field illuminator or the dark field illuminator, whether or not a contrast of the image of the information code is higher than a predetermined contrast level; and a reading unit which reads the information code from the image of which the contrast is judged by the contrast judging unit to be higher than the predetermined contrast level.

14. The reader according to claim 1, wherein the dark field illuminator has a plurality of dark field illuminating units each of which emits a dark field light, the group of bright field illuminating units is partitioned into three blocks or more, the group of dark field illuminating units is partitioned into three blocks or more, and the control section comprises:

an illumination control unit that controls the bright and dark field illuminators to light the blocks of bright field illuminating units by turns and to light the blocks of dark field illuminating units by turns;

a contrast judging unit that judges, each time the illumination control unit lights one block of bright field illuminating units or one block of dark field illuminating units, whether or not a contrast of the image of the information code is higher than a predetermined contrast level; and a reading unit which reads the information code from the image of which the contrast is judged by the contrast judging unit to be higher than the predetermined contrast level.

15. The reader according to claim 1, wherein each of the bright field illuminating units emits any of a plurality of monochromatic lights as the bright field light, the dark field illuminator has a plurality of dark field illuminating units each of which emits any of a plurality of monochromatic lights, the group of bright field illuminating units is partitioned into three blocks or more, the group of dark field illuminating units is partitioned into three blocks or more, and the control section comprises:

an illumination control unit that controls the bright and dark field illuminators to select the blocks of bright field illuminating units and the blocks of dark field illuminating units by turns, and to emit the monochromatic lights from the selected block of illuminating units by turns;

a contrast judging unit that judges, each time one of the monochromatic lights is emitted from one block of bright field illuminating units or one block of dark field illuminating units, whether or not the image of the information code is higher than a predetermined contrast level; and a reading unit which reads the information code from the image of which the contrast is judged by the contrast judging unit to be higher than the predetermined contrast level.

16. The reader according to claim 1, further comprising:
a diffused light illuminator that can be lighted to illuminate the information code with a diffused light, and
wherein the control section is adapted to light the bright field illuminator, the dark field illuminator and the diffused light illuminator by turns to cause the optical system to form an image of the information code from each of the first light, the second light and the diffused light.

17. The reader according to claim 16, wherein the diffused light illuminator comprises:
a light emitter that emits a third light; and
a light diffusing member that diffuses the third light to form the diffused light and transmits the diffused light to the information code.

18. The reader according to claim 17, wherein the light diffusing member has a granulated wall so as to change the third light transmitted through the granulated wall to the diffused light.

19. The reader according to claim 17, wherein the light diffusing member has a translucent wall so as to change the third light transmitted through the translucent wall to the diffused light.

20. The reader according to claim 17, wherein the light diffusing member has a wall with concavities or convexities so as to change the third light transmitted through the wall to the diffused light.

21. The reader according to claim 1, wherein the control section lights the bright field illuminator and the dark field illuminator by turns such that the optical system forms an image of the information code from each of the first and second lights reflected on the information code and reads the information code from the formed images.

22. The reader according to claim 1, wherein the control section simultaneously lights the bright and dark field illuminators such that the optical system forms an image of the information code from the first and second lights reflected on the information code and reads the information code from the formed image.

23. An information reader for optically reading an information code directly marked on an object, comprising:
an optical system that forms an image of the information code from a light reflected on the information code, the information code being placed around an optical axis of the optical system;
a plurality of first light emitting units each of which can be lighted to emit a first light;
a plurality of second light emitting units each of which can be lighted to emit a second light;
a dark field illuminator that changes a transmission direction of the first lights emitted from the first light emitting units to form first changed lights such that the first changed lights are transmitted toward the optical axis so as to illuminate the information code at a first luminous angle to the information code in a dark field illumination along first illumination directions differing from one another;
a bright field illuminator that changes a transmission direction of the second lights emitted from the second light emitting units to form second changed lights such that the second changed lights are transmitted toward a direction substantially parallel to the optical axis so as to illuminate the information code at a second luminous angle to the information code in a bright field illumination along second illumination directions differing from one another, the second luminous angle differing from the first luminous angle; and
a control section that controls the first and second light emitting units by selecting a group of the first light emitting units and a group of the second light emitting units by turns, selecting the first or second light emitting units of each selected group by turns and lighting each selected light emitting unit such that the optical system forms an image of the information code from the first and second lights first or second light of each selected lighted light emitting unit, and reads the information code from the images.

24. The reader according to claim 23, further comprising:
a first light leading member, having a first refractive index, that leads the first lights of the first group of light emitting units to the dark field illuminator; and
a second light leading member, having a second refractive index larger than the first refractive index, that leads the second lights of the second group of light emitting units to the bright field illuminator.

25. The reader according to claim 23, wherein the dark field illuminator has a light reflecting wall, inclined to an emission direction of the first lights emitted from the light emitting units, that reflects the first lights toward the optical axis.

26. The reader according to claim 25, wherein the light reflecting wall has a reflecting coating layer such that each of the first lights incident on the light reflecting wall is substantially totally reflected on the reflecting coating layer.

27. The reader according to claim 23, wherein the bright field illuminator has a light refracting wall, substantially formed in a semi-spherical shape, that refracts the second lights toward the direction substantially parallel to the optical axis.

28. The reader according to claim 23, further comprising:
a reading opening, disposed at a front end of the reader, through which each of the first and second changed lights reflected on the information code reaches the optical system, the dark and bright field illuminators being placed adjacent to the reading opening;
a light leading member that leads the first and second lights emitted from the light emitting units to the dark and bright field illuminators,
wherein the light emitting units are placed inside the reader.

29. The reader according to claim 23, wherein
the group of first light emitting units is partitioned into three blocks or more,
the group of second light emitting units is partitioned into three blocks or more,
a group of first lights emitted from each block of first light emitting units has an illumination direction differing from those of the other groups of first lights emitted from the other blocks of first light emitting units,
a group of second lights emitted from each block of second light emitting units has an illumination direction differing from those of the other groups of second lights emitted from the other blocks of second light emitting units, and
the control section is adapted to light the blocks of first or second light emitting units of the selected group by turns.

* * * * *

UNITED STATES PATENT AND TRADEMARK OFFICE
CERTIFICATE OF CORRECTION

| | | |
|---|---|---|
| PATENT NO. | : 7,871,003 B2 | Page 1 of 1 |
| APPLICATION NO. | : 11/826551 | |
| DATED | : January 18, 2011 | |
| INVENTOR(S) | : Miyazaki et al. | |

It is certified that error appears in the above-identified patent and that said Letters Patent is hereby corrected as shown below:

IN THE CLAIMS:

Col. 28, claim 1, line 16, change "minor" to --mirror--;
      claim 1, line 24, change "lights" to --switches--; and
      claim 1, line 29, change "lighted" to --switched--.

Signed and Sealed this
Fifth Day of April, 2011

David J. Kappos
*Director of the United States Patent and Trademark Office*